(12) United States Patent
Kurabayashi et al.

(10) Patent No.: US 6,794,427 B2
(45) Date of Patent: *Sep. 21, 2004

(54) LIQUID COMPOSITION AND INK SET, AND IMAGE-FORMING PROCESS AND APPARATUS USING THE SAME

(75) Inventors: Yutaka Kurabayashi, Tokorozawa (JP); Keiichi Murai, Yokohama (JP); Katsuhiro Shirota, Inagi (JP); Katsuhiko Takahashi, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 142 days.

This patent is subject to a terminal disclaimer.

(21) Appl. No.: 08/635,335

(22) Filed: Apr. 19, 1996

(65) Prior Publication Data

US 2002/0077386 A1 Jun. 20, 2002

Related U.S. Application Data

(63) Continuation of application No. 08/356,466, filed on Dec. 15, 1994, now abandoned.

(30) Foreign Application Priority Data

| Dec. 20, 1993 | (JP) | 5-319988 |
| Dec. 20, 1993 | (JP) | 5-320019 |
| Jul. 8, 1994 | (JP) | 6-179764 |
| Nov. 18, 1994 | (JP) | 6-285257 |
| Nov. 18, 1994 | (JP) | 6-285400 |

(51) Int. Cl.$^7$ .................................................. C09D 11/62
(52) U.S. Cl. .................... 523/161; 524/502; 106/31.27; 106/31.6; 106/31.13; 260/DIG. 38
(58) Field of Search ................ 523/161; 524/502; 106/22 R, 23 R, 20 D, 31.27, 31.6, 31.13; 260/DIG. 38

(56) References Cited

U.S. PATENT DOCUMENTS

| 4,538,160 A |   | 8/1985  | Uchiyama ............... 346/140 |
| 4,694,302 A |   | 9/1987  | Hackleman et al. ...... 346/1.1 |
| 4,804,411 A | * | 2/1989  | Eida et al. ................ 106/22 |
| 5,059,246 A |   | 10/1991 | Yamamoto et al. ....... 106/22 |
| 5,118,351 A |   | 6/1992  | Shirota et al. ............ 106/22 |
| 5,151,128 A | * | 9/1992  | Fukushima et al. ....... 106/20 |
| 5,190,581 A |   | 3/1993  | Fukushima et al. ...... 106/20 D |
| 5,220,347 A |   | 6/1993  | Fukushima et al. ...... 346/1.1 |
| 5,250,121 A |   | 10/1993 | Yamamoto et al. ....... 106/22 |
| 5,329,305 A |   | 7/1994  | Fukushima et al. ...... 347/95 |
| 5,358,558 A |   | 10/1994 | Yamamoto et al. ....... 106/22 |
| 5,549,740 A | * | 8/1996  | Takahashi et al. ....... 106/20 R |
| 5,614,007 A | * | 3/1997  | Kurabayashi et al. .... 106/22 R |
| 5,618,338 A | * | 4/1997  | Kurabayashi et al. .... 106/26 R |
| 5,624,484 A | * | 4/1997  | Takahashi et al. ....... 106/31.75 |
| 5,792,249 A | * | 8/1998  | Shirota et al. ........... 106/31.27 |
| 5,985,975 A | * | 11/1999 | Kurabayashi et al. ..... 524/462 |
| 6,399,674 B1 | * | 6/2002  | Kashiwazaki et al. .... 523/161 |

FOREIGN PATENT DOCUMENTS

| AU | 69709/74  |    | 12/1975 |
| AU | 25048/77  |    | 11/1978 |
| AU | 43214/85  |    | 12/1985 |
| AU | 34807/89  |    | 11/1989 |
| AU | 42636/89  |    | 4/1990  |
| AU | 83557/91  |    | 3/1992  |
| AU | 20370/92  |    | 1/1993  |
| EP | 0487349 A1 |   | 5/1992  |
| EP | 0487349   |    | 5/1992  |
| EP | 0507239 A1 |   | 10/1992 |
| GB | 2088777   |    | 6/1982  |
| JP | 5565269   |    | 5/1980  |
| JP | 5566976   |    | 5/1980  |
| JP | 61-132376 |    | 6/1986  |
| JP | 61-172787 |    | 8/1986  |
| JP | 6159911   |    | 12/1986 |
| JP | 6159912   |    | 12/1986 |
| JP | 6159914   |    | 12/1986 |
| JP | 62-38155  |    | 8/1987  |
| JP | 6238155   | *  | 8/1987  |
| JP | 62-198493 |    | 9/1987  |
| JP | 6322681   |    | 1/1988  |
| JP | 6360783   |    | 3/1988  |
| JP | 63299971  |    | 12/1988 |
| JP | 63-299971 |    | 12/1988 |
| JP | 649279    |    | 1/1989  |
| JP | 6463185   |    | 3/1989  |
| JP | 6469381   |    | 3/1989  |

OTHER PUBLICATIONS

The Printing Ink Manual, 5th Ed. 1961, Editors Leach et al. pp. 683–690, Table 12.1, p. 696.*
Patent Abstracts of Japan, vol. 13, No. 133, Apr. 4, 1989, p. M–809, with respect to JP–A–63–299971.

* cited by examiner

*Primary Examiner*—Terrel Morris
*Assistant Examiner*—John J. Guarriello
(74) *Attorney, Agent, or Firm*—Fitzpatrick, Cella, Harper & Scinto

(57) ABSTRACT

Disclosed herein is a colorless or pale-colored liquid composition comprising a cationic substance, wherein the liquid composition contains in combination a cationic substance and a nonionic polymeric substance.

75 Claims, 4 Drawing Sheets

LIQUID COMPOSITION AND INK SET, AND IMAGE-FORMING PROCESS AND APPARATUS USING THE SAME

This application is a continuation of application Ser. No. 08/356,466 filed Dec. 15, 1994 now abandoned.

BACKGROUND OF THE INVENTION

1. Field of the Invention

The present invention relates to a technique capable of lessening bleeding which occurs upon the formation of color images with inks and providing images high in water fastness. In particular, it relates to an image-forming process and an apparatus making good use of an ink-jet system, and a liquid composition and an ink set, which are suitable for use in such process and apparatus.

2. Related Background Art

An ink-jet recording method is a system in which recording is conducted by flying out droplets of an ink to apply them to a recording medium such as paper. In particular, according to the methods disclosed in Japanese Patent Publication Nos. 61-59911, 61-59912 and 61-59914, in which an electrothermal converter is used as an ejection-energy supply means to apply thermal energy to an ink so as to generate bubbles, thereby ejecting droplets of the ink, the formation of a high-density multi-orifice in a recording head can be realized with ease, and high-resolution and high-quality images can be recorded at high speed.

However, the conventional inks used in ink-jet recording generally comprise, as a principal component, water, and include additionally a water-soluble high boiling solvent such as glycol for the purpose of preventing drying and clogging, and the like. When such an ink has been used to conduct recording on plain paper, there have been encountered disadvantages that fixing ability cannot be sufficiently achieved, and image irregularity occurs, which appears to be attributed to the uneven distribution of the filler and size on the surface of the recording paper. In particular, when color images are intended to form, plural inks of different colors are overlapped one after another before they are fixed to paper. Therefore, color bleeding and uneven color mixing have occurred at portions of boundaries between images of different colors (this phenomenon will hereinafter be referred to as "bleeding" simply), resulting in a failure to obtain satisfactory images.

As a means for enhancing fixing ability of inks, Japanese Patent Application Laid-Open No. 55-65269 discloses the addition of a compound capable of enhancing penetrability, such as a surfactant, into the inks. Besides, Japanese Patent Application Laid-Open No. 55-66976 discloses the use of inks comprising, as a principal component, a volatile solvent. However, the former method has involved a disadvantage that although the penetrability of the inks into recording paper is improved, and so the fixing ability is improved and bleeding can be prevented to some extent, the image density and the saturation of the resulting image are lowered because coloring materials penetrate deeply into the recording paper together with the inks. In addition, the inks have also involved a problem that they spread in lateral directions, resulting in reduction of edge sharpness and resolution. On the other hand, the latter method is liable to cause clogging due to the evaporation of the solvent in a nozzle of a recording head in addition to the above-described disadvantages. Such methods have hence not been preferred.

In order to improve the above-described problems, further, there have been disclosed methods of applying a liquid, which can make the quality of images better, to a recording medium prior to the jetting of a recording ink.

For example, Japanese Patent Application Laid-Open No. 63-60783 discloses a method in which a liquid containing a basic polymer is applied to a recording medium, and recording is then conducted with inks containing an anionic dye. Japanese Patent Application Laid-Open No. 63-22681 discloses a recording method in which the first liquid containing a reactive chemical species and the second liquid containing a compound reacting with the reactive chemical species are mixed on a recording medium. Japanese Patent Application Laid-Open No. 63-299971 discloses a method in which a liquid containing an organic compound having two or more cationic groups per molecule is applied to a recording medium, and recording is then conducted with inks containing an anionic dye. Japanese Patent Application Laid-Open No. 64-9279 discloses a method in which an acidic liquid containing succinic acid or the like is applied to a recording medium, and recording is then conducted with inks containing an anionic dye.

Further, Japanese Patent Application Laid-Open Nos. 64-63185 and 64-69381 disclose a method of applying a liquid, which insolubilizes dyes, to a recording medium prior to recording.

However, all these methods intend to prevent bleeding of images or improve the water fastness of images owing to the deposition of the dyes themselves in the inks. Therefore, these methods are still insufficient in the effect to prevent the above-described bleeding between inks of different colors, and moreover poor in coverability of the inks on pulp fibers in the recording paper because the dyes deposited tend to distribute unevenly on the recording paper, resulting in reduction of evenness of images.

SUMMARY OF THE INVENTION

With the foregoing circumstances in view, the present invention has been completed with a view toward satisfying the following five requirements for ink-jet recording on plain paper:

(1) being able to provide images excellent in quality of characters while retaining good fixing ability;

(2) being able to achieve sufficient image density and provide solid images high in evenness; and in particular, upon formation of color images on plain paper;

(3) being able to prevent bleeding;

(4) being excellent in color reproductivity and being able to provide high-fine images; and (5) being able to achieve perfect water fastness of recorded images.

The above object can be achieved by the present invention described below.

In the first aspect of the present invention, there is provided a liquid composition comprising a cationic substance, wherein the liquid composition contains in combination a cationic substance and a nonionic polymeric substance.

In the second aspect of the present invention, there is provided a liquid composition comprising a cationic substance, wherein the liquid composition contains in combination a cationic oligomer having a molecular weight distribution in which a peak exists in a molecular weight region, and a nonionic polymeric substance.

In the third aspect of the present invention, there is provided a liquid composition comprising a cationic substance, wherein the cationic substance has a molecular weight distribution in which at least one peak exists in two molecular weight regions.

In the fourth aspect of the present invention, there is provided an ink set comprising in combination one of the above-described liquid compositions and at least one of yellow, magenta, cyan, black, red, blue and green inks.

In the fifth aspect of the present invention, there is provided an ink set comprising in combination one of the above-described liquid compositions and three inks of yellow, magenta and cyan colors.

In the sixth aspect of the present invention, there is provided an ink set comprising in combination one of the above-described liquid compositions and four inks of yellow, magenta, cyan and black colors.

According to the present invention, the above inks may contain an anionic compound, and the anionic compound may be a polymeric substance having a molecular weight of at least 5,000, or a surfactant.

In the seventh aspect of the present invention, there is provided a process of forming an image, which comprises the steps of (A) applying one of the above-described liquid compositions to at least an image-forming region of a recording medium and (B) applying an ink comprising an anionic compound to the recording medium by an ink-jet system.

In the eighth aspect of the present invention, there is provided an image forming apparatus comprising one of the above-described ink sets and an ink-jet means.

In the ninth aspect of the present invention, there is provided an image forming apparatus comprising the first recording unit equipped with a container part containing one of the above-described liquid compositions and an ejection means therefor, and the second recording unit equipped with container parts separately containing inks comprising an anionic compound and ejection means therefor.

DESCRIPTION OF THE PREFERRED EMBODIMENTS

Figure 1:
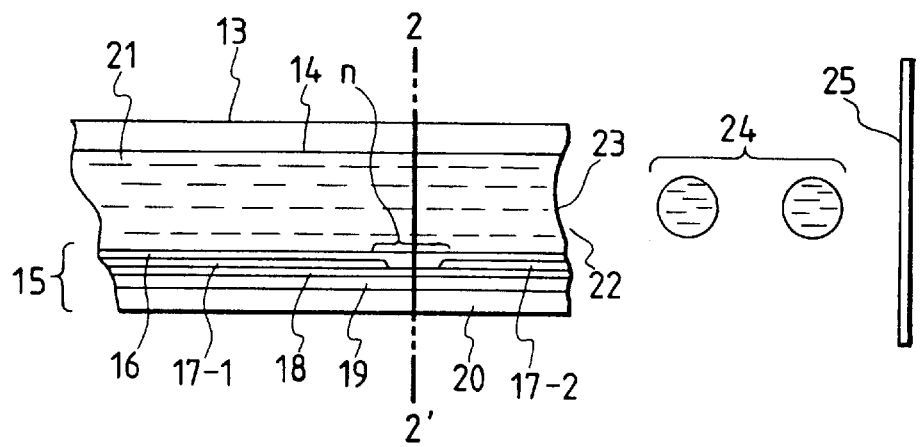
FIG. 1 is a longitudinal cross-sectional view of a head of an ink-jet recording apparatus.

The operation of the present invention will hereinafter be described.

In the present invention, the liquid composition and an ink or a pigment ink are mixed on recording paper or at a position penetrated in the recording paper. As a result, as the first step of the reaction, the low-molecular weight cationic substance or cationic oligomer contained in the liquid composition associates with a water-soluble dye having an anionic group used in the ink or an anionic compound used in the pigment ink owing to ionic interaction, so that they momentarily separate from the respective solution phases. As a result, breaking of dispersion occurs in the pigment ink, whereby aggregates of the pigment are formed.

As the second step of the reaction, the aggregates formed by the association of the dye and the low-molecular weight cationic substance or cationic oligomer, or the aggregates of the pigment are adsorbed on the nonionic or cationic polymeric substances. Therefore, the aggregates of the dye formed by the association in the dye ink, or the aggregates of the pigment further increase in size, and become difficult to enter the interfiber spaces of the recording paper. As a result, only the liquid component separated from the solid component is caused to penetrate into the recording paper, whereby the compatibility of print quality and fixing ability can be achieved. At the same time, the aggregates formed from the low-molecular weight cationic substance or cationic oligomer, the anionic dye in the ink or the anionic compound and pigment in the pigment ink, and the nonionic or cationic polymeric substances increase in viscosity and hence do not move with the movement of the liquid medium. In this case, the preferable molecular weights of the polymers are at least 2,000 for the nonionic polymers, and at least 1,500 for the cationic polymers. Accordingly, the coloring ability of the dye or pigment is improved, and inks of different colors are not mixed with each other even if adjoining dots are formed by these inks, for example, upon formation of a full-color image, and so bleeding does also not occur. Since the aggregates are insoluble in water in themselves, the image formed comes to have perfect water fastness. When the pigment is used as a coloring material, the pigment aggregates on the surface of the recording paper, and so the coverability of the resulting ink is increased, resulting in marked improvement of coloring ability.

The preferred embodiments of the present invention will then be described to explain the present invention in more detail.

First of all, the liquid composition according to the first aspect of the present invention will be described.

The essential components to be contained in the colorless or pale-colored liquid composition described in the first aspect of the present invention are as follows:

(1) a low-molecular weight cationic substance having a molecular weight of at most 1,000, and (2) a nonionic polymeric substance having a molecular weight of at least 2,000.

On the other hand, the inks used in the present invention comprise:

(3) a water-soluble dye having at least an anionic group, while other inks used in the present invention comprise:

(4) a pigment and an anionic compound.

The action and effect of the above-described substances are as described above. More specifically, the low-molecular weight cationic substance of the component (1) having a molecular weight of at most 1,000 (preferably, 100 to 700) associates with the water-soluble dye of the component (3) having at least an anionic group, which is contained in the ink, or the anionic compound of the component (4) in the pigment ink owing to ionic interaction to form aggregates. The rate of this aggregate-forming reaction must be extremely fast.

Preferable specific examples of the low-molecular weight cationic substance of the component (1) having a molecular weight of at most 1,000, preferably from 100 to 700, are mentioned below.

As the preferable examples thereof, may be mentioned compounds of the primary, secondary and tertiary amine salt types, specifically, the hydrochlorides, acetates and the like of laurylamine, coconut amine, stearylamine, rosin amine and the like, and besides compounds of the quaternary ammonium salt type, specifically, lauryltrimethylammonium chloride, lauryldimethylbenzylammonium chloride, benzyltributylammonium chloride, benzalkonium chloride, cetyltrimethylammonium chloride and the like, pyridinium salt type compounds, specifically, cetylpyridinium chloride, cetylpyridinium bromide and the like, imidazoline type cationic compounds, specifically, 2-heptadecenylhydroxyethylimidazoline and the like, and ethylene oxide adducts of secondary alkylamines, specifically, dihydroxyethylstearylamine and the like.

In the first aspect of the present invention, amphoteric surfactants exhibiting cationic properties in a certain pH region may also be used.

More specifically, there are mentioned amino acid type amphoteric surfactants, compounds of the RNHCH$_2$—CH$_2$COOH type, betaine type compounds, specifically, stearyldimethylbetaine and lauryldihydroxyethylbetaine, and the like. If these amphoteric surfactants are used, it goes without saying that the colorless or pale-colored liquid composition must be adjusted either so as to have a pH not higher than their isoelectric point or so as to reach the pH not higher than the isoelectric point when mixed with the ink on a recording medium.

Although the examples of the low-molecular weight cationic compounds have been mentioned above, it goes without saying that cationic compounds usable in the first aspect of the present invention are not always limited to these compounds.

The action and effect of the nonionic polymeric substance of the component (2) having a molecular weight of at least 2,000 in the first aspect of the present invention are as described above. More specifically, as the second step of the reaction of the liquid composition with the ink, the aggregates of the above-described dye or the anionic compound in the pigment ink and the low-molecular weight cationic substance formed by the association are adsorbed into its molecule to increase the size of the aggregates of the dye or the pigment formed by the association so as to become difficult to enter the interfiber spaces of the recording paper, whereby only the liquid component separated from the solid component is caused to penetrate into the recording paper to achieve the compatibility of print quality and fixing ability.

As specific examples of the component (2), may be mentioned nonionic water-soluble polymers, i.e., polyacrylamide, polyvinyl pyrrolidone, water-soluble cellulosics such as carboxymethylcellulose, hydroxymethylcellulose and hydroxypropylcellulose, polyvinyl methyl ether, polyvinyl acetal, and polyvinyl alcohol. It goes without saying that the component (2) is not limited to these polymeric substances. The effect of these polymeric substances in the practice of the present invention can be sufficiently achieved so far as they have a molecular weight of at least 2,000. However, polymeric substances having a molecular weight of not lower than 2,000 but not higher than 10,000 are more preferred.

The molecular weight of the polymeric substance in the present invention means a weight average molecular weight determined in terms of polyethylene oxide by means of GPC (gel permeation chromatography) unless expressly noted.

The amount of these components to be contained in the colorless or pale-colored liquid composition may preferably be within a range of from 0.05 to 20% by weight, more preferably from 0.5 to 5% by weight based on the total weight of the liquid composition. It is however necessary to determine an optimum range according to the combination of the individual substances to be used. The mixing ratio of the low-molecular weight cationic substance of the component (1) to the polymeric substance of the component (2) in the liquid composition is within a range of from 10:1 to 1:10, preferably from 5:1 to 1:5 by weight. If this ratio exceeds 10:1, the water fastness of the resulting print tends to be deteriorated. On the other hand, if the ratio is not lower than 1:10, the prevention of bleeding becomes insufficient, and so the edge sharpness of images formed tends to be reduced.

Second, the liquid composition according to the second aspect of the present invention is a liquid composition comprising a cationic substance and characterized in that the composition comprises in combination a cationic oligomer having a molecular weight distribution in which a peak exists in a molecular weight region of not higher than 1,000, and a nonionic polymeric substance having a molecular weight of at least 2,000. The liquid composition may preferably further contain a cationic surfactant.

The action and effect of the liquid composition according to the second aspect of the present invention are as described above. More specifically, the cationic oligomer contained in the liquid composition, which has a molecular weight distribution in which a peak exists in a molecular weight region of not higher than 1,000, first associates with the anionic compound contained in the ink owing to ionic interaction to form aggregates. The rate of this aggregate-forming reaction must be extremely fast.

The components of the liquid composition according to the second aspect of the present invention will hereinafter be described. As specific examples of monomer units forming the cationic oligomer having a molecular weight distribution in which a peak exists in a molecular weight region of not higher than 1,000, said oligomer being an essential component to the liquid composition according to the second aspect of the present invention, may be mentioned vinylamine, allylamine, vinylpyridine, vinylimidazole, N,N-dimethylaminoacrylamide, ethyleneimine and 2-oxazoline. However, the monomer units are not limited to these compounds.

Examples of cationic oligomers formed from the monomer units mentioned above include polycations such as polyvinylamine, polyallylamine, polyvinylpyridine and polyethyleneimine and the hydrochlorides, acetates and sulfates thereof, and besides these the quaternary ammonium salts of polyoxyethylene derivatives, which have the structure

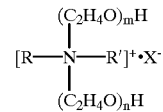

wherein R and R' denote individually an alkyl or benzyl, m+n is an integer of 2 to 10, X$^-$ denotes Br$^-$, Cl$^-$, I$^-$, CH$_3$COO$^-$, C$_2$H$_5$SO$_3^-$ or the like. However, the oligomers are not limited to these oligomers.

The oligomers usable in the second aspect of the present invention may be copolymers with monomer units having a nonionic pendant group.

With respect to the molecular weight distribution of the cationic oligomers used in the second aspect of the present invention, the individual oligomers may be subjected to GPC measurement in advance. Alternatively, the molecular weight distribution may be determined in the following manner. Namely, after the molecular weight distribution of the liquid composition itself is determined, a sufficient amount of the ink containing the dye having at least an anionic group is mixed under stirring with the liquid composition in a beaker, and precipitate formed is removed. Thereafter, the GPC measurement is conducted again to compare the measurement results before the mixing of the ink and after the mixing of the ink and the removal of the precipitate with each other, whereby the molecular weight distribution of the oligomer is found from the molecular weight distribution of the component precipitated by the dye in the ink and removed from the system.

In order to more enhance the effect of the present invention, such a cationic surfactant as mentioned below may be further contained in the liquid composition.

Specific examples of such a cationic surfactant include compounds of the primary, secondary and tertiary amine salt types, specifically, the hydrochlorides, acetates and the like of laurylamine, coconut amine, stearylamine, rosin amine and the like; compounds of the quaternary ammonium salt type, specifically, lauryltrimethylammonium chloride, lauryldimethylbenzylammonium chloride, benzyltributylammonium chloride, benzalkonium chloride and the like; pyridinium salt type compounds, specifically, cetylpyridinium chloride, cetylpyridinium bromide and the like; imidazoline type cationic compounds, specifically, 2-heptadecenyl-hydroxyethylimidazoline and the like; and ethylene oxide adducts of higher alkylamines, specifically, dihydroxyethyl-stearylamine and the like.

In the second aspect of the present invention, amphoteric surfactants exhibiting cationic properties in a certain pH region may also be used. More specifically, there are mentioned carboxylic acid type amphoteric surfactants, such as amino acid type amphoteric surfactants; compounds of the R—NH—CH$_2$—CH$_2$—COOH type; and betaine type compounds, specifically, stearyldimethylbetaine and lauryldihydroxyethylbetaine, and besides amphoteric surfactants of the sulfuric ester type, sulfonic acid type, phosphoric ester type and the like. If these amphoteric surfactants are used, it goes without saying that the liquid composition must be adjusted either so as to have a pH not higher than their isoelectric point or so as to reach the pH not higher than the isoelectric point when mixed with the ink on a recording medium.

Although the examples of the cationic compounds have been mentioned above, it goes without saying that compounds usable in the second aspect of the present invention are not always limited to these compounds.

The nonionic polymeric substance having a molecular weight of at least 2,000, which is another essential component to the liquid composition according to the second aspect of the present invention, will hereinafter be described. The action and effect of the nonionic polymeric substance in the present invention are also as described above. More specifically, as the second step of the reaction of the liquid composition with the ink, the aggregates of the dye having the anionic group and the cationic oligomer formed by the association as the first step are adsorbed into its molecule to increase the size of the aggregates of the dye formed by the association so as to become difficult to enter the interfiber spaces of the recording paper, whereby the coloring material in the ink is left on the recording paper, and only the liquid component separated from the solid component is caused to penetrate into the recording paper to achieve the compatibility of print quality and fixing ability.

As specific examples of the nonionic polymeric substance exhibiting the action and effect as described above, may be mentioned nonionic water-soluble polymers, i.e., polyacrylamide, polyvinyl pyrrolidone, water-soluble cellulosics such as carboxymethylcellulose, hydroxymethylcellulose and hydroxypropylcellulose, polyvinyl methyl ether, polyvinyl acetal, and polyvinyl alcohol. It goes without saying that the polymeric substance is not limited to these polymeric substances. The effect of these polymeric substances in the practice of the present invention can be sufficiently exhibited so far as they have a molecular weight of at least 2,000. However, polymeric substances having a molecular weight of not lower than 2,000 but not higher than 10,000 may preferably be used.

In order to more enhance the effect of the present invention, a cationic polymeric substance may be used in combination with the nonionic polymeric substance described above in the second aspect of the present invention. As examples of the cationic polymeric substance used in this case, may be mentioned polyallylamine hydrochloride, polyamine sulfone hydrochloride, polyvinylamine hydrochloride and chitosan acetate. It goes without saying that the cationic polymeric substance is not limited to these substances.

In the second aspect of the present invention, a compound obtained by partly cationizing a nonionic polymeric substance may be used as the cationic polymeric substance. As specific examples of such a compound, may be mentioned copolymers of vinylpyrrolidone and an aminoalkylalkylate quaternary salt and copolymers of acrylamide and an aminomethylacrylamide quaternary salt. It goes without saying that the compound is not limited to these compounds.

If the above-described polymeric substances and the cationic polymeric substance are soluble in water, there is nothing to be said against them. However, they may be in the form of a dispersion such as latex or emulsion.

The amount of these components to be contained in the liquid composition according to the second aspect of the present invention may preferably be within a range of from 0.05 to 20% by weight, more preferably from 0.5 to 5% by weight based on the total weight of the liquid composition. It is however necessary to determine an optimum range according to the combination of the individual substances to be used. The mixing ratio of the cationic oligomer to the nonionic polymeric substance in the liquid composition as described above is within a range of from 10:1 to 1:10, preferably from 5:1 to 1:5 by weight. If this ratio exceeds 10:1, the water fastness of the resulting print tends to be deteriorated. On the other hand, if the ratio is not lower than 1:10, the prevention of bleeding becomes insufficient, and so the edge sharpness of images formed tends to be reduced. It is hence not preferable to use these substances outside the above range of the mixing ratio.

The liquid composition according to the third aspect of the present invention will hereinafter be described.

The essential components to be contained in such a liquid composition are as follows:

(21) a low-molecular weight cationic substance having a molecular weight distribution in which at least one peak exists in a molecular weight region of not higher than 1,000, and

(22) a cationic polymeric substance having a molecular weight distribution in which at least one peak exists in a molecular weight region of not lower than 1,500.

On the other hand, the inks used in the present invention comprise:

(23) a water-soluble dye having at least an anionic group, while other inks used in the present invention comprise:

(24) a pigment and an anionic compound.

The action and effect of the above-described substances in the third aspect of the present invention are as described above. More specifically, the low-molecular weight cationic substance of the component (21) in which the peak of the molecular weight distribution exists in a region of 1,000 or lower associates with the water-soluble dye of the component (23) having at least an anionic group, which is contained in the ink, or the anionic compound in the pigment ink owing to ionic interaction to form aggregates. The rate of this aggregate-forming reaction must be extremely fast.

Preferable specific examples of the low-molecular weight cationic substance of the component (21) in which the peak of the molecular weight distribution exists in a region of 1,000 or lower are mentioned below. Incidentally, a compound close to monodisperse in the molecular weight distribution may often be used as the low-molecular weight cationic substance in the third aspect of the present invention. With respect to a compound having no molecular weight distribution, a usual molecular weight found from its chemical formula is considered as a position of the peak.

As preferable examples thereof, may be mentioned compounds of the primary, secondary and tertiary amine salt types, specifically, the hydrochlorides, the acetates and the like of laurylamine, coconut amine, stearylamine, rosin amine and the like, and besides compounds of the quaternary ammonium salt type, specifically, lauryltrimethylammonium chloride, lauryldimethylbenzylammonium chloride, benzyltributylammonium chloride, benzalkonium chloride, cetyltrimethylammonium chloride and the like, pyridinium salt type compounds, specifically, cetylpyridinium chloride, cetylpyridinium bromide and the like, imidazoline type cationic compounds, specifically, 2-heptadecenylhydroxyethylimidazoline and the like, and ethylene oxide adducts of secondary alkylamines, specifically, dihydroxyethylstearylamine and the like.

In the third aspect of the present invention, amphoteric surfactants exhibiting cationic properties in a certain pH region may also be used.

More specifically, there are mentioned amino acid type amphoteric surfactants, compounds of the $RNHCH_2—CH_2COOH$ type, betaine type compounds, specifically, stearyldimethylbetaine and lauryldihydroxyethylbetaine, and the like. If these amphoteric surfactants are used, it goes without saying that the colorless or pale-colored liquid composition must be adjusted either so as to have a pH not higher than their isoelectric point or so as to reach the pH not higher than the isoelectric point when mixed with the ink on a recording medium.

Although the examples of the low-molecular weight cationic compounds have been mentioned above, it goes without saying that compounds usable in the third aspect of the present invention are not always limited to these compounds.

The action and effect of the cationic polymeric substance of the component (22) in which the peak of the molecular weight distribution exists in a region of not lower than 1,500 are as described above. More specifically, as the second step of the reaction of the liquid composition with the ink, the aggregates of the above-described dye or the anionic compound in the pigment ink and the low-molecular weight cationic substance formed by the association are adsorbed into its molecule to increase the size of the aggregates of the dye or the pigment formed by the association so as to become difficult to enter the interfiber spaces of the recording paper, whereby only the liquid component separated from the solid component is caused to penetrate into the recording paper to achieve the compatibility of print quality and fixing ability.

As specific examples of the cationic polymeric substance of the component (22), may be mentioned polyallylamine, polyamine sulfone, polyvinylamine, chitosan, and neutralized products or partly neutralized products of these compounds with an acid such as hydrochloric acid or acetic acid. It goes without saying that the cationic polymeric substance is not limited to these substances. The effect of these polymeric substances in the practice of the present invention can be sufficiently exhibited so far as they have a molecular weight distribution in which at least one peak exists in a molecular weight region of not lower than 1,500. However, polymeric substances having a molecular weight of not lower than 1,500 but not higher than 10,000 may be preferably used.

As other examples of the cationic polymeric substance of the component (22) used, may be mentioned compounds obtained by partly cationizing a nonionic polymeric substance.

As specific examples of such compounds, may be mentioned copolymers of vinylpyrrolidone and an aminoalkylalkylate quaternary salt and copolymers of acrylamide and an aminomethylacrylamide quaternary salt. It goes without saying that the compound is not limited to these compounds.

If the above-described cationic polymeric substances are soluble in water, there is nothing to be said against them. However, they may be in the form of a dispersion such as latex or emulsion.

The amount of these components to be contained in the colorless or pale-colored liquid composition may preferably be within a range of from 0.05 to 20% by weight, more preferably from 0.5 to 5% by weight based on the total weight of the liquid composition. It is however necessary to determine an optimum range according to the combination of the individual substances to be used. The mixing ratio of the low-molecular cationic substance of the component (21) to the polymeric substance of the component (22) in the liquid composition is within a range of from 10:1 to 1:10, preferably from 5:1 to 1:5 by weight. If this ratio exceeds 10:1, the water fastness of the resulting print tends to be deteriorated. On the other hand, if the ratio is not lower than 1:10, the prevention of bleeding becomes insufficient, and so the edge sharpness of images formed tends to be reduced.

In the present invention, the use of the cationic polymeric substance has more effects than the use of the nonionic polymeric substance from the viewpoint of the coloring ability of dyes and pigments, the resistance to bleeding in a region in which a shot-in ink quality is great, and water fastness under more severe conditions.

Other components making up the colorless or pale-colored liquid compositions described above will then be described specifically.

The colorless or pale-colored liquid compositions are generally composed of water, a water-soluble organic solvent and other additives in addition to the above-described respective components. As examples of the water-soluble organic solvent used include amides such as dimethylformamide and dimethylacetoamide, ketones such as acetone, ethers such as tetrahydrofuran and dioxane, polyalkylene glycols such as polyethylene glycol and polypropylene glycol, alkylene glycols such as ethylene glycol, propylene glycol, butylene glycol, triethylene glycol, thiodiglycol, hexylene glycol and diethylene glycol; 1,2,6-hexanetriol, lower alkyl ethers of polyhydric alcohols, such as ethylene glycol methyl ether, diethylene glycol monomethyl ether and triethylene glycol monomethyl ether, monohydric alcohols such as ethanol, isopropyl alcohol, n-butyl alcohol and isobutyl alcohol, and besides, glycerol, N-methyl-2- pyrrolidone, 1,3-dimethylimidazolidinone, triethanolamine, sulfolane and dimethyl sulfoxide.

No particular limitation is imposed on the content of the water-soluble organic solvent. However, it may preferably be within a range of from 5 to 60% by weight, more preferably from 5 to 40% by weight based on the total weight of the liquid composition.

Besides the above components, additives such as a viscosity modifier, pH adjustor, antiseptic, surfactant, antioxidant and evaporation accelerator may be incorporated as needed. The selection of the surfactant is particularly important from the viewpoint of controlling the penetrability of the liquid composition.

The colorless or pale-colored liquid composition means a composition having a color tone which does not change the color tone of the recording inks. With respect to preferable physical property ranges at about 25° C. of the colorless or pale-colored liquid compositions, the pH may be within a range of from 3 to 12, preferably from 3 to 8, more preferably from 3 to 5, the surface tension may be within a range of from 10 to 60 dyne/cm, preferably 10 to 40 dyne/cm, and the viscosity may be within a range of from 1 to 30 cP.

Inks described in the present invention are commonly used concurrently with the liquid composition in the first to third aspects mentioned above.

Then, the recording inks (type I) useful in the practice of the present invention according to an aspect of the present invention will hereinafter be described.

Besides a water-soluble dye having the anionic group described above, the recording inks (type I) used in the present invention comprise water and a water-soluble organic solvent, and optionally other components such as a viscosity modifier, pH adjustor, antiseptic, surfactant and antioxidant.

No particular limitation is imposed on the dyes having the anionic group used in the present invention so far as they are water-soluble acid dyes, direct dyes or reactive dyes, which are described in COLOR INDEX. Any dye not described in COLOR INDEX may also be used without any particular limitation so far as it has an anionic group, for example, a sulfonic group or a carboxylic group. Among the water-soluble dyes used herein, those having dependence of solubility on pH are also included as a matter of course.

As the water-soluble organic solvent used in the inks, the water-soluble organic solvents used in the colorless or pale-colored liquid compositions as described above may be used similarly. The same shall apply to the preferable range of the content of the water-soluble organic solvent. The preferable physical property ranges are exactly the same as those of the colorless or pale-colored liquid compositions.

In order to more enhance the effects of the present invention, an anionic surfactant or an anionic polymeric substance may be added to the inks in addition to the components described above. Alternatively, the above-described amphoteric surfactant may also be used after adjusting it to a pH not lower than its isoelectric point. As examples of the anionic surfactant used, may be mentioned those commonly used in inks, such as carboxylic acid salt type, sulfuric acid ester type and sulfonic acid salt type. As examples of the anionic polymeric substance, may be mentioned alkali-soluble resins, specifically, sodium polyacrylate and copolymers obtained by introducing an acrylic acid in a part of a polymer. It goes without saying that such compounds are not limited to these compounds.

Next, the recording inks (type II) useful in the practice of the present invention according to another aspect of the present invention will hereinafter be described.

Besides a pigment and an anionic compound, the recording inks (type II) comprise water and a water-soluble organic solvent, and optionally other components such as a viscosity modifier, pH adjustor, antiseptic, surfactant and antioxidant. In this aspect, the anionic compound may be a dispersant for the pigment, or if the dispersant for the pigment is not an anionic compound, an anionic compound may be used in addition to the dispersant. It goes without saying that even if the dispersant is an anionic compound, another anionic compound may be added.

No particular limitation is imposed on the pigments used in this aspect of the present invention. Specifically, the following pigments may preferably be used.

First of all, as carbon black used in a black pigment ink, there may be used those produced in accordance with the furnace process or channel process and having a primary particle size of 15 to 40 nm, a specific surface area of 50 to 300 $m^2/g$ as determined in accordance with the BET method, an oil absorption of 40 to 150 ml/100 g as determined by using DBP, a volatile matter of 0.5 to 10%, and a pH of 2 to 9, for example, commercially-available carbon black such as No. 2300, No. 900, MCF 88, No. 40, No. 52, MA 7, MA 8 and No. 2200 B (all, products of Mitsubishi Chemical Industries Limited), RAVEN 1255 (product of Columbian Carbon Japan Limited), REGAL 400R, REGAL 660R and MOGUL L (all, products of Cabot Company), and Color Black FW1, Color Black FW18, Color Black S170, Color Black S150, Printex 35 and Printex U (all, products of Degussa). Those newly prepared for the practice of the present invention may also be used. As examples of pigments used in yellow, magenta and cyan inks, may be mentioned C.I. Pigment Yellow 1, C.I. Pigment Yellow 2, C.I. Pigment Yellow 3, C.I. Pigment Yellow 13, C.I. Pigment Yellow 16 and C.I. Pigment Yellow 83; C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 112 and C.I. Pigment Red 122; and C.I. Pigment Blue 1, C.I. Pigment Blue 2, C.I. Pigment Blue 3, C.I. Pigment Blue 15:3, C.I. Pigment Blue 16, C.I. Pigment Blue 22, C.I. Vat Blue 4 and C.I. Vat Blue 6, respectively. However, those newly prepared for the practice of the present invention may also be used. The pigments as mentioned above may preferably be used within a range of from 1 to 20% by weight, more preferably from 2 to 12% by weight based on the total weight of their corresponding inks.

As the dispersant used in this aspect of the present invention, any resin may be used so far as it is soluble in water. However, the resin preferably has a weight average molecular weight ranging from 1,000 to 30,000, more preferably from 3,000 to 15,000. Specific examples thereof include block copolymers, graft copolymers and random copolymers composed of at least two monomers (at least one monomer being hydrophilic) selected from hydrophobic monomers such as styrene, styrene derivatives, vinylnaphthalene, vinylnaphthalene derivatives and aliphatic alcohol esters of α,β-ethylenically unsaturated carboxylic acids, acrylic acid, acrylic acid derivatives, maleic acid, maleic acid derivatives, itaconic acid, itaconic acid derivatives, fumaric acid, and fumaric acid derivatives, and salts of these copolymers. These resins are alkali-soluble resins which dissolve in an aqueous solution of a base. Besides, homopolymers composed of a hydrophilic monomer or salts thereof may be used. Further, other water-soluble resins such as polyvinyl alcohol, carboxymethylcellulose and condensation products of naphthalene sulfonic acid and formaldehyde may also be used. However, the use of the alkali-soluble resin has an advantage in that the viscosity of the resultant dispersion can be made low, and moreover the pigment can be easily dispersed. The water-soluble resin may preferably be used in a range of from 0.1 to 5% by weight based on the total weight of the ink.

It is further desirable that the inks according to this aspect of the present invention is adjusted to neutrality or alkalinity, preferably, as the whole because the solubility of the water-soluble resin is enhanced, so that an ink far excellent in long-term storability can be provided. It is more desirable that the pH be adjusted to a range of from 7 to 10.

Examples of the pH adjustor include various kinds of organic amines such as diethanolamine and triethanolamine, inorganic alkalis such as the hydroxides of alkali metals, for example, sodium hydroxide, lithium hydroxide, potassium hydroxide, etc., organic acids, and mineral acids.

The pigment and water-soluble resin as described above are dispersed or dissolved in an aqueous medium.

An aqueous medium suitable for use in the inks (type II) according to this aspect of the present invention is a mixed solvent of water and a water-soluble organic solvent. As the water, it is preferable to use ion-exchanged water (deionized water) instead of tap water containing various ions.

As examples of the water-soluble organic solvent used in combination with water, may be mentioned alkyl alcohols having 1 to 4 carbon atoms, such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones and ketone alcohols such as acetone and diacetone alcohol; ethers such as tetrahydrofuran and dioxane; polyalkylene glycols such as polyethylene glycol and polypropylene glycol; alkylene glycols the alkylene moiety of which has 2 to 6 carbon atoms, such as ethylene glycol, propylene glycol, butylene glycol, triethylene glycol, thiodiglycol, hexylene glycol and diethylene glycol; 1,2,6-hexanetriol; glycerol; lower alkyl ethers of polyhydric alcohols, such as ethylene glycol monomethyl (or monoethyl) ether, diethylene glycol methyl (or ethyl) ether and triethylene glycol monomethyl (or monoethyl) ether; N-methyl-2-pyrrolidone; 2-pyrrolidone; 1,3-dimethyl-2-imidazolidinone; and the like. Among a number of these water-soluble organic solvents, polyhydric alcohols such as diethylene glycol and lower alkyl ethers of polyhydric alcohols, such as triethylene glycol monomethyl (or monoethyl) ether are preferred.

In order to achieve good ejection stability, it is effective to add further ethanol or isopropyl alcohol in an amount of 1% or more because the addition of these solvents is considered to permit more stable bubbling of the recording ink on a thin film resistor. However, the addition of these solvents in excess involves a drawback that the print quality of the resulting print is impaired. The suitable concentration of these solvents has been found to be 3 to 10% by weight. These solvent have a further effect that the addition of the solvents to the dispersion prevents foaming upon the preparation of the dispersion, thereby effectively conducting the dispersion.

The content of the water-soluble organic solvent in the ink according to this aspect of the present invention is generally within a range of from 3 to 50%, preferably from 3 to 40% by weight based on the total weight of the ink, while the content of water used is within a range of from 10 to 90% by weight, preferably from 30 to 80% by weight based on the total weight of the ink.

If the dispersant is not an anionic polymer, an anionic compound must be further added to the pigment-containing ink. As anionic compounds suitably used in this aspect of the present invention, may be mentioned polymeric substances such as the alkali-soluble resins described as the dispersants for the pigments, and besides low-molecular weight anionic surfactants.

As specific examples of the low-molecular weight anionic surfactants, may be mentioned disodium lauryl sulfosuccinate, disodium polyoxyethylene lauroylethanola-mide sulfosuccinate, disodium polyoxyethylene alkylsulfosuccinate, carboxylated polyoxyethylene lauryl ether sodium salt, carboxylated polyoxyethylene tridecyl ether sodium salt, sodium polyoxyethylene lauryl ether sulfate, triethanolamine polyoxyethylene lauryl ether sulfate, sodium polyoxyethylene alkyl ether sulfate, sodium alkylsulfate and triethanolamine alkylsulfate, to which, however, they are not limited.

The suitable amount of the above-described anionic substances to be used is within a range of from 0.05 to 10% by weight, more preferably from 0.05 to 5% by weight based in the total weight of the ink.

Further, the inks according to this aspect of the present invention may contain, in addition to the above components, a surfactant, antifoaming agent, antiseptic and the like as needed to provide them as inks having desired physical properties. Commercially-available water-soluble dyes and/ or the like may also be added thereto.

Examples of the surfactant include anionic surfactants such as fatty acid salts, salts of higher alcohol sulfates, salts of liquid fatty oil sulfates and alkylallylsulfonates; and nonionic surfactants such as polyoxyethylene alkyl ethers, polyoxyethylene alkyl esters, polyoxyethylene sorbitan alkyl esters, acetylene alcohol and acetylene glycol. These surfactants may be suitably chosen for either single use or combined use. The amount of the surfactants to be used may vary according to the kind of the dispersant used. However, it may desirably be within a range of from 0.01 to 5% by weight based on the total weight of the ink. In this case, it is preferred that the amount of the surfactants added be determined in such a manner that the surface tension of the resulting ink is 30 dyne/cm or higher. If the surface tension is lower than this value, such an ink brings about undesirable situations such as slippage upon printing (defective ink-droplet impact) due to the wetting on orifices in such a recording system as used in the present invention.

Each of the inks (type II) according to this aspect of the present invention is prepared in the following manner. The pigment is first added to an aqueous solution containing at least the dispersant resin and water, and the mixture is stirred. A dispersion treatment is then conducted in accordance with a dispersing technique described below, and if necessary, a centrifugation is carried out to obtain a desired dispersion. The components as mentioned above are then added to the dispersion. The resultant mixture is stirred to prepare the intended ink.

If the alkali-soluble resin is used, it is necessary to add a base for dissolving the resin in the dispersion. It is also necessary to add the amine or base required to dissolve the resin in an amount at least once of the amount of the amine or base calculated out from the acid value of the resin. This calculated amount of the amine or base is found in accordance with the equation $$\text{Amount of amine or base (g)} = \frac{\text{Acid value of resin} \times \text{Molecular weight of amine} \times \text{Amount of resin (g)}}{5600}.$$

It is further preferable from the view point of improving the dispersion efficiency to conduct premixing for at least 30 minutes prior to the dispersion treatment of the aqueous solution containing the pigment. This premixing serves to improve the wettability of the surface of the pigment and facilitate adsorption of the dispersant on the pigment surface.

In case the alkali-soluble resin is used, preferable examples of the bases added to the dispersion include organic amines such as monoethanolamine, diethanolamine, triethanolamine and aminomethylpropanol, ammonia, and inorganic bases such as potassium hydroxide and sodium hydroxide.

Any dispersing machine routinely used may be employed as a dispersing machine used in the present invention. As examples thereof, may be mentioned ball mills and sand mills.

Of these mills, high-speed sand mills are preferred. Examples thereof include Super Mill, Sand Grinder, Beads Mill, Agitator Mill, Grain Mill, Dyno Mill, Pearl Mill, Coball Mill (all, trade names), etc.

No particular limitation is imposed on the recording medium used in the practice of the present invention, and the so-called plain paper such as paper for copying and bond paper, which are routinely used, are preferably used. It goes without saying that coated paper specially prepared for ink-jet recording, and transparent films for OHP may also be suitably used, and besides general-purpose woodfree paper and glossy paper may also be suitably used.

Any method may be used as the image-forming method according to the present invention so far as it is a method in which the colorless or pale-colored liquid composition and the ink can be caused to coexist on a recording medium. No problem arises if either of the liquid composition and the ink is first applied to the recording medium.

The term "image-forming region" as used herein means a region of a recording medium, to which dots of the ink are applied, while the term "the vicinity of the image-forming region" means an outside region about 1 to 5 dots away from the region to which dots of the ink are applied.

As a method of applying the colorless or pale-colored liquid composition to the recording medium, it is considered to apply the liquid composition to the whole surface of the recording medium by a sprayer, roller or the like. However, the application is preferably carried out by an ink-jet system by which the liquid composition can be applied selectively and evenly only to the image-forming region where the ink will be applied, and the vicinity of the image-forming region.

No particular limitation is imposed on the time required from the time the liquid composition is applied to the recording medium up to the time the ink is then applied. In order to carry out the present invention more effectively, however, it is preferable to apply the ink within several seconds, particularly preferably, within 1 second. The same shall apply to the case where the ink is first applied to a recording medium, and the colorless or pale-colored liquid composition is then applied.

As the method of applying the colorless or pale-colored liquid composition to the recording medium, various kinds of ink-jet recording systems may be used. However, the so-called On-Demand type thermal ink-jet system in which bubbles generated by thermal energy are used to eject droplets is particularly preferred.

Figure 2:
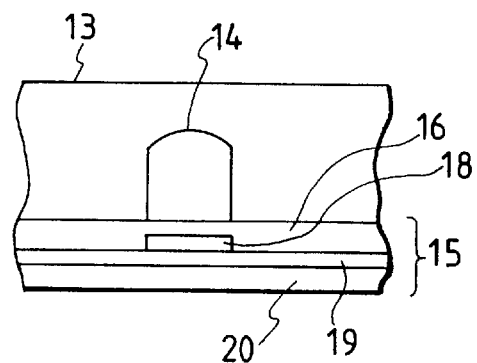
FIG. 2 is a transverse cross-sectional view of the head of the ink-jet recording apparatus.
Figure 3:
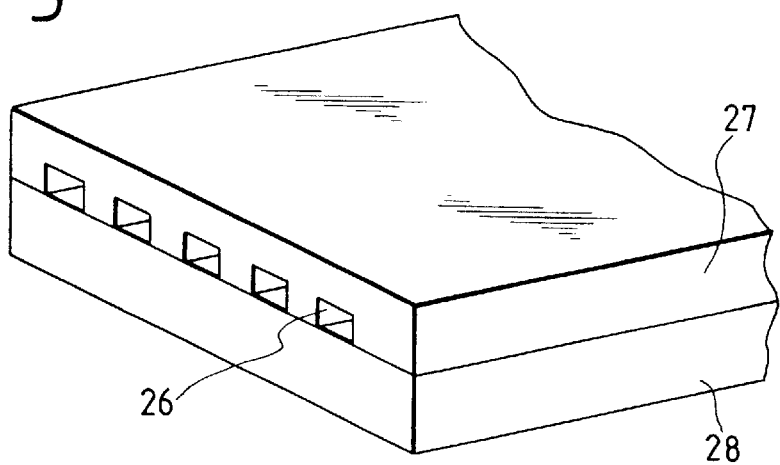
FIG. 3 is a perspective view of the appearance of another head of the ink-jet recording apparatus.

Recording apparatus useful in the practice of the present invention will then be described. In the present invention, the so-called On-Demand type thermal ink-jet system in which a recording signal is applied to a recording ink in a recording head to eject droplets of the ink by the thermal energy generated is preferred. Examples of the construction of a recording head, which is a main component of such an apparatus, are illustrated in FIGS. 1, 2 and 3.

A head 13 is formed by bonding a glass, ceramic, plastic plate or the like having an ink-passing channel to a heating head 15, which is used for thermal recording and has a heating resistor (the drawing shows a head to which, however, is not limited). The heating head 15 is composed of a protective film 16 made of silicon oxide or the like, aluminum electrodes 17-1 and 17-2, a heating resistor layer 18 made of nichrome or the like, a heat accumulating layer 19, and a substrate 20 made of alumina or the like having a good heat radiating property.

A recording ink 21 comes up to an ejection orifice 22 and forms a meniscus 23 owing to a pressure P.

Now, upon application of electric signals to the electrodes 17-1, 17-2, the heating head 15 rapidly generates heat at the region shown by n to form bubbles in the ink 21 which is in contact with this region. The meniscus 23 of the ink is projected by the action of the pressure thus produced, and the ink 21 is ejected from the orifice 22 to a recording medium 25 in the form of recording droplets 24. FIG. 3 schematically illustrates a multi-head composed of an array of a number of heads as shown in FIG. 1. The multi-head is formed by closely bonding a glass plate or the like 27 having a number of channels to a heating head 28 similar to the head as illustrated in FIG. 1.

Incidentally, FIG. 1 is a cross-sectional view of the head 13 taken along the flow path of the ink, and FIG. 2 is a cross-sectional view taken along line 2–2' in FIG. 1.

Figure 4:
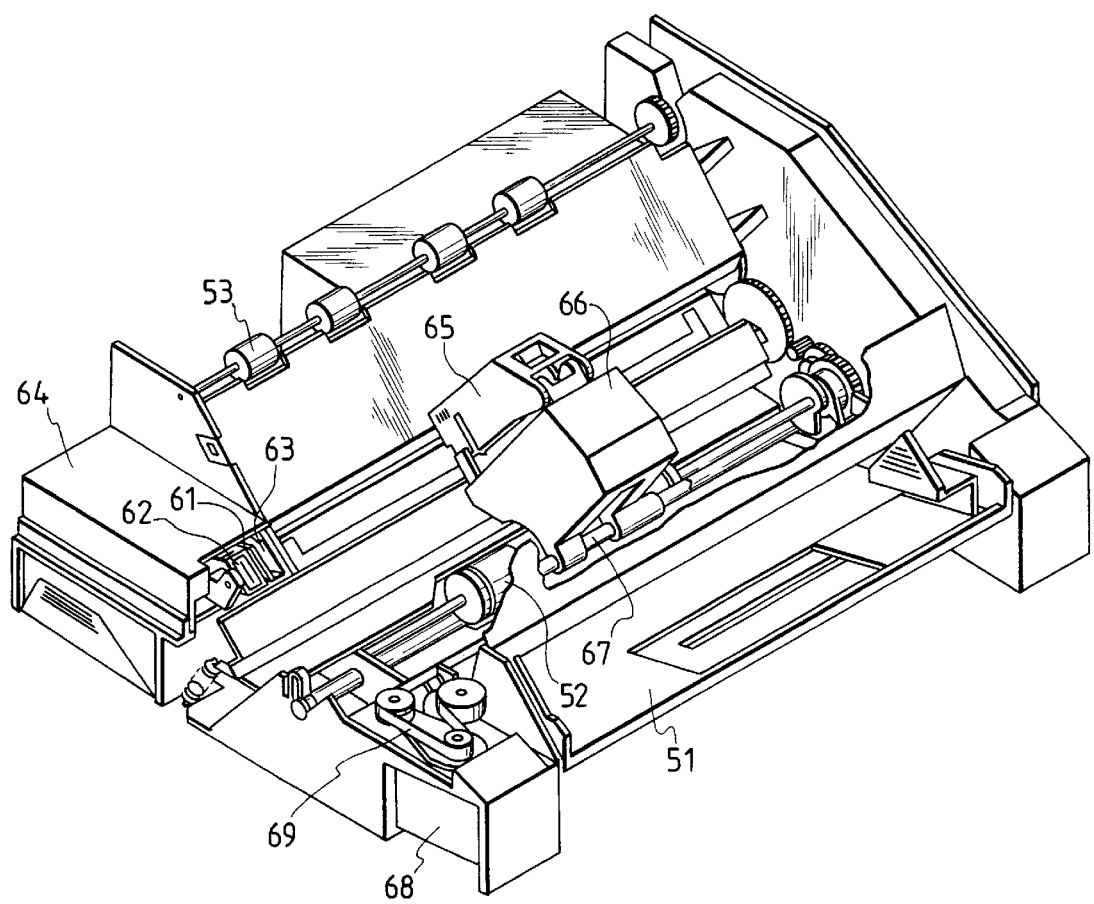
FIG. 4 is a perspective view of an illustrative ink-jet recording apparatus.

FIG. 4 illustrates an exemplary ink-jet recording apparatus in which such a head has been incorporated.

In FIG. 4, reference numeral 61 designates a blade serving as a wiping member, one end of which is a stationary end held by a blade-holding member to form a cantilever. The blade 61 is provided at a position adjacent to a region in which a recording head operates, and in this embodiment, is held in such a form that it protrudes to the course through which the recording head is moved. Reference numeral 62 indicates a cap, which is provided at a home position adjacent to the blade 61, and is so constituted that it moves in a direction perpendicular to a direction in which the recording head is moved and comes into contact with the face of ejection openings to cap it. Reference numeral 63 denotes an ink-absorbing member provided adjoiningly to the blade 61 and, similar to the blade 61, held in such a form that it protrudes to the course through which the recording head is moved. The above-described blade 61, cap 62 and absorbing member 63 constitute an ejection-recovery portion 64, where the blade 61 and absorbing member 63 remove water, dust and/or the like from the face of the ink-ejecting openings.

Reference numeral 65 designates the recording head having an ejection-energy-generating means and serving to eject the ink onto a recording medium set in an opposing relation with the ejection opening face provided with ejection openings to conduct recording. Reference numeral 66 indicates a carriage on which the recording head 65 is mounted so that the recording head 65 can be moved. The carriage 66 is slidably interlocked with a guide rod 67 and is connected (not illustrated) at its part to a belt 69 driven by a motor 68. Thus, the carriage 66 can be moved along the guide rod 67 and hence, the recording head 65 can be moved from a recording region to a region adjacent thereto.

Reference numerals 51 and 52 denote a paper feeding part from which the recording media are separately inserted, and paper feed rollers driven by a motor (not illustrated), respectively. With such construction, the recording medium is fed to the position opposite to the ejection opening face of the recording head, and discharged from a paper discharge section provided with paper discharge rollers 53 with the progress of recording.

In the above constitution, the cap 62 in the head recovery portion 64 is receded from the moving course of the recording head 65 when the recording head 65 is returned to its home position, for example, after completion of recording, and the blade 61 remains protruded to the moving course. As a result, the ejection opening face of the recording head 65 is wiped. When the cap 62 comes into contact with the ejection opening face of the recording head 65 to cap it, the cap 62 is moved so as to protrude to the moving course of the recording head.

When the recording head 65 is moved from its home position to the position at which recording is started, the cap 62 and the blade 61 are at the same positions as the positions upon the wiping as described above. As a result, the ejection opening face of the recording head 65 is also wiped at the time of this movement.

The above movement of the recording head to its home position is made not only when the recording is completed or the recording head is recovered for ejection, but also when the recording head is moved between recording regions for the purpose of recording, during which it is moved to the home position adjacent to each recording region at given intervals, where the ejection opening face is wiped in accordance with this movement.

Figure 5:
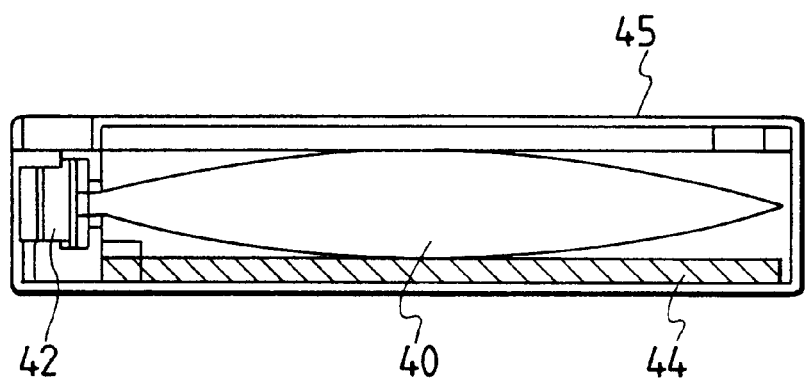
FIG. 5 is a longitudinal cross-sectional view of an ink cartridge.

FIG. 5 illustrates an exemplary ink cartridge in which an ink to be fed to the head through an ink-feeding member, for example, a tube is contained. Here, reference numeral 40 designates an ink container portion containing the ink to be fed, as exemplified by a bag for the ink. One end thereof is provided with a stopper 42 made of rubber. A needle (not illustrated) may be inserted into this stopper 42 so that the ink in the bag 40 for the ink can be fed to the head. Reference numeral 44 indicates an ink absorbing member for receiving a waste ink.

It is preferable that the ink container portion is formed of a polyolefin, in particular, polyethylene, at its surface with which the ink comes into contact.

The ink-jet recording apparatus used in the present invention may not be limited to the apparatus as described above in which the head and the ink cartridge are separately provided. Therefore, a device in which these members are integrally formed as shown in FIG. 6 can also be preferably used.

Figure 6:
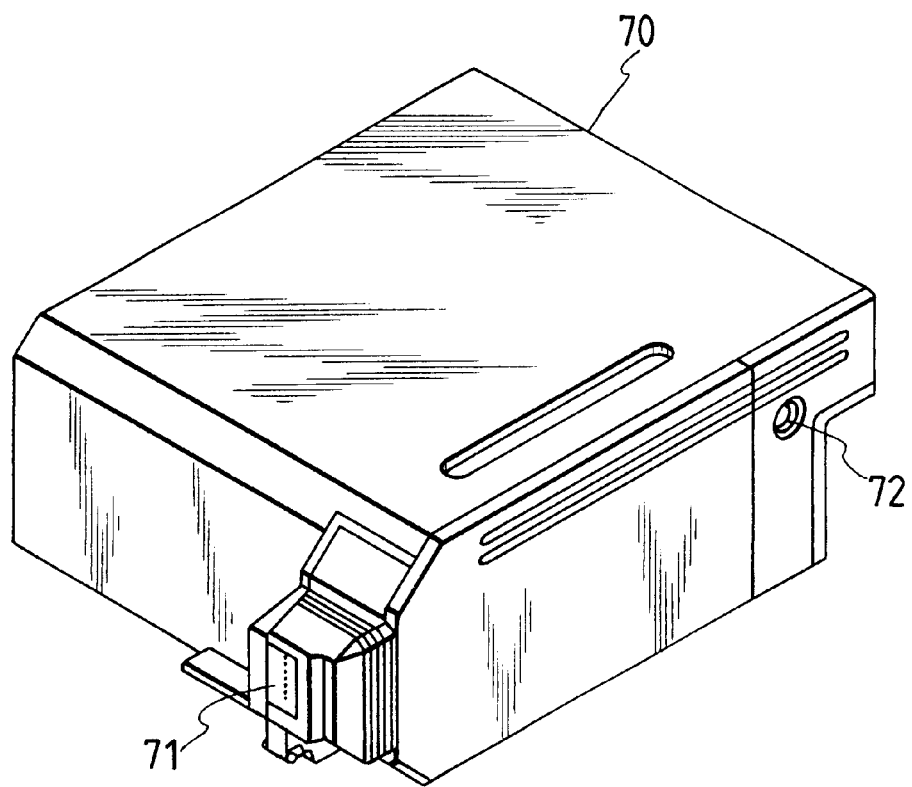
FIG. 6 is a perspective view of a recording unit.

In FIG. 6, reference numeral 70 designates a recording unit, in the interior of which an ink container portion containing an ink, for example, an ink-absorbing member, is contained. The recording unit 70 is so constructed that the ink in such an ink-absorbing member is ejected in the form of ink droplets through a head 71 having a plurality of orifices. For example, polyurethane may be used as a material for the ink-absorbing member. Reference numeral 72 indicates an air passage for communicating the interior of the recording unit 70 with the atmosphere. This recording unit 70 can be used in place of the recording head shown in FIG. 4, and is detachably installed on the carriage 66. Incidentally, in the recording apparatus used in the present invention, the ink-jet recording apparatus in which thermal energy is applied to an ink to eject droplets of the ink has been described by way of example. However, the present invention can also be used in other ink-jet recording apparatus such as a piezo-system using a piezoelectric element.

Figure 7:
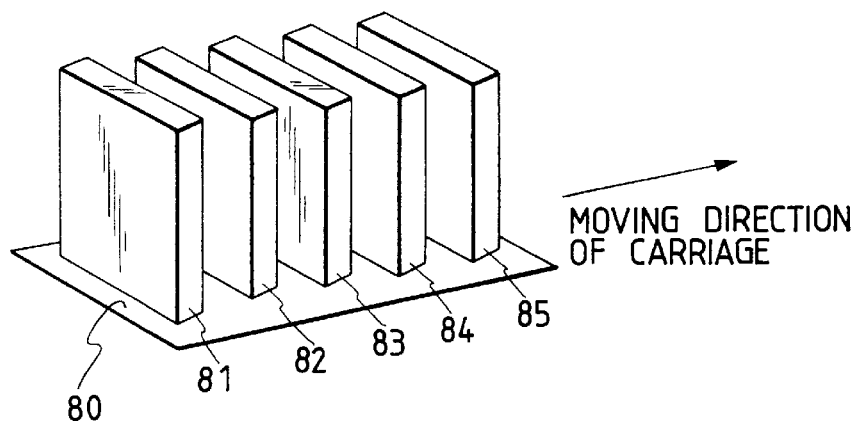
FIG. 7 is a perspective view illustrating a recording part used in examples of the present invention, in which a plurality of recording heads is arranged.
Figure 8:
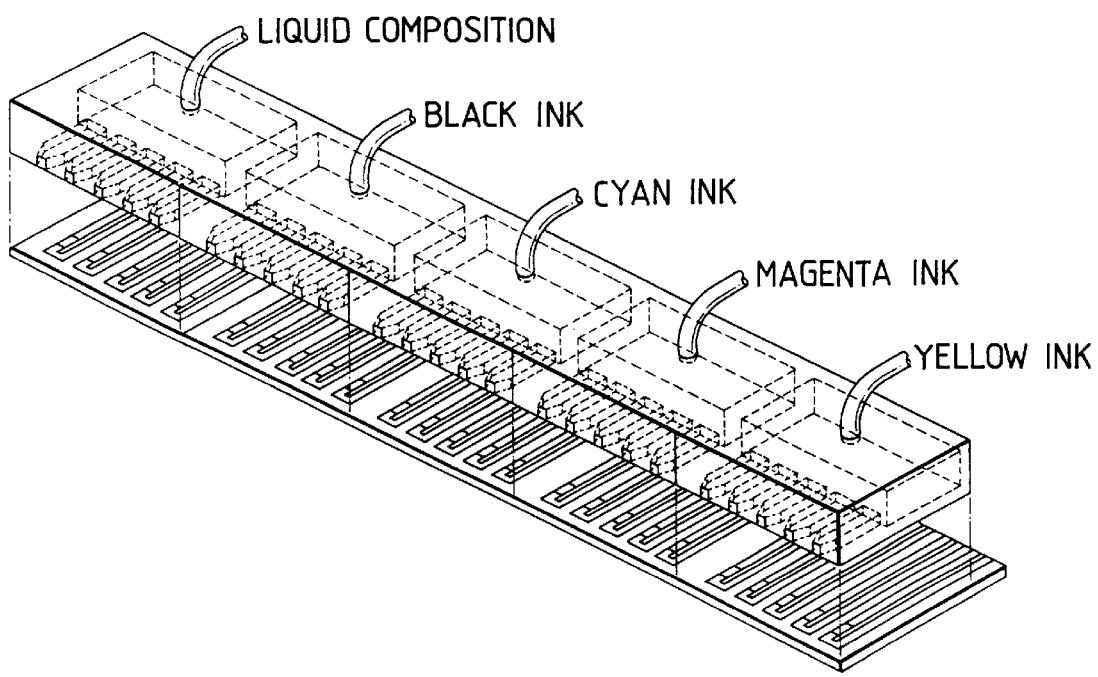
FIG. 8 is a perspective view of another recording head used in the present invention.

In the case where the image-forming process according to the present invention is carried out, for example, a recording apparatus in which five recording heads, each of which has been illustrated in FIG. 3, are arranged on a carriage 80, is used. An example thereof is illustrated in FIG. 7. Reference numerals 81, 82, 83 and 84 indicate recording heads for ejecting inks of yellow, magenta, cyan and black colors, respectively. Reference numeral 85 designates a head for ejecting the liquid composition. The heads are arranged in the above-described recording apparatus and serve to eject the respective recording inks of the different colors according to recording signals. Before the ejection of the inks, the liquid composition is applied in advance to at least portions of recording paper where the recording inks of the different colors are to apply thereto. FIG. 7 shows the case where the five recording heads have been used. However, the present invention is not limited thereto. As shown in FIG. 8, preference is given even to the case where the flow paths of the yellow, magenta, cyan and black inks and the liquid composition are separately provided in one recording head.

It goes without saying that construction of the head may be changed so as to reverse the recording order of the liquid composition and the inks as described above.

The present invention will hereinafter be described more specifically by the following examples and comparative examples. Incidentally, all designations of "part" or "parts" and "%" as will be used in the following examples mean part or parts by weight and % by weight unless expressly noted.

EXAMPLES 1 TO 42

[Preparation of Colorless or Pale-colored Liquid Composition]

The following respective components were mixed into solutions, and the resultant solutions were then filtered under pressure through a membrane filter (Fluoropore Filter, trade name: product of Sumitomo Electric Industries, Ltd.) having a pore size of 0.22 µm, thereby obtaining colorless or pale-colored Liquid Compositions $I_A$ through $I_H$. pHs of the Liquid Compositions $I_A$ to $I_H$ were adjusted by treating the respective solutions with NaOH or HCl after the preparation thereof.

Composition of Liquid Composition $I_A$:

| | |
|---|---|
| Benzyltri-n-butylammonium chloride (product of Tokyo Kasei Kogyo Co., Ltd.) | 1.5 parts |
| Sanflock N-500P (polyacrylamide, product of Sanyo Chemical Industries, Ltd.) | 0.5 part |
| Thiodiglycol | 10 parts |
| Deionized water | 88 parts |
| pH of $I_A$ = 7.0. | |

Composition of Liquid Composition $I_B$:

| | |
|---|---|
| Benzalkonium chloride (product of Sanyo Chemical Industries, Ltd.) | 0.5 parts |
| Polyacrylamide (synthesized in our company) | 3.0 parts |
| Thiodiglycol | 10 parts |
| Deionized water | 86.5 parts |
| pH of $I_B$ = 4.8. | |

Composition of Liquid Composition $I_C$:

| | |
|---|---|
| Benzalkonium chloride (product of Sanyo Chemical Industries, Ltd.) | 1.5 parts |
| Polyvinyl alcohol (synthesized in our company, Mw = 2,500, complete saponification) | 10 parts |
| Thiodiglycol | 10 parts |
| Deionized water | 78.5 parts |
| pH of $I_C$ = 4.8. | |

Composition of Liquid Composition $I_D$:

| | |
|---|---|
| Benzalkonium chloride (product of Sanyo Chemical Industries, Ltd.) | 1.5 parts |
| Polyvinyl alcohol (synthesized in our company, Mw = 9,000, complete saponification) | 5 parts |
| Thiodiglycol | 10 parts |
| Deionized water | 83.5 parts |
| pH of $I_D$ = 4.9. | |

Composition of Liquid Composition $I_E$:

| | |
|---|---|
| Benzalkonium chloride (product of Sanyo Chemical Industries, Ltd.) | 1.5 parts |
| Polyvinyl alcohol (synthesized in our company, Mw = 26,000, complete saponification) | 1 part |
| Thiodiglycol | 10 parts |
| Deionized water | 87.5 parts |
| pH of $I_E$ = 7.5. | |

Composition of Liquid Composition $I_F$:

| | |
|---|---|
| Benzalkonium chloride (product of Sanyo Chemical Industries, Ltd.) | 1.5 parts |
| PVP K-15 (product of International Specialty Chemicals, Mw = 7,000) | 5 parts |
| Thiodiglycol | 10 parts |
| Deionized water | 83.5 parts |
| pH of $I_F$ = 5.0. | |

Composition of Liquid Composition $I_G$:

| | |
|---|---|
| Levon TM-16 (cetyltrimethylammonium chloride, product of Sanyo Chemical Industries, Ltd.) | 3.0 parts |
| PVP K-15 (product of International Specialty Chemicals, Mw = 7,000) | 3 parts |
| Thiodiglycol | 10 parts |
| Deionized water | 84.0 parts |
| pH of $I_G$ = 4.5. | |

Composition of Liquid Composition $I_H$:

| | |
|---|---|
| Levon 15 (sodium alkyl diaminoethyl-glycinate, the alkyl group is a lauryl group, product of Sanyo Chemical Industries, Ltd.) | 1.5 parts |
| PVP K-15 (product of International Specialty Chemicals, Mw = 7,000) | 3 parts |
| Thiodiglycol | 10 parts |
| Deionized water | 85.5 parts |
| pH of $I_H$ = 3.2. | |

[Preparation of Recording Ink]

(Preparation of Recording Ink $1_1$)

The following respective components were mixed into solutions, and the resultant solutions were filtered under pressure through a membrane filter (Fluoropore Filter, trade name: product of Sumitomo Electric Industries, Ltd.) having a pore size of 0.22 μm, thereby obtaining Recording Ink $1_1$ composed of yellow, magenta, cyan and black inks. Yellow Ink $Y1_1$ of Recording Ink $1_1$:

| | |
|---|---|
| C.I. Direct Yellow 86 | 2 parts |
| Thiodiglycol | 10 parts |
| Acetylenol EH (EO adduct of acetylene glycol, product of Kawaken Fine Chemicals Co., Ltd.) | 0.05 part |
| Deionized water | 87.95 parts. |

Cyan Ink $C1_1$ of Recording Ink $1_1$:

The same composition as that of Yellow Ink $Y1_1$ except that C.I. Direct Yellow 86 in $Y1_1$ was changed to 2.5 parts of C.I. Direct Blue 199, and the amount of deionized water was changed to 87.45 parts.

Magenta Ink $M1_1$ of Recording Ink $1_1$:

The same composition as that of Cyan Ink $C1_1$ except that C.I. Direct Blue 199 in $C1_1$ was changed to 2.5 parts of C.I. Acid Red 289.

Black Ink $Bk1_1$ of Recording Ink $1_1$:

The same composition as that of Magenta Ink $M1_1$ except that 2.5 parts of C.I. Acid Red 289 in $Y1_1$ were changed to 4.0 parts of C.I. Food Black 2, and the amount of deionized water was changed to 85.95 parts.

(Preparation of Recording Ink $1_2$)

Recording Ink $1_2$ composed of inks $Y1_2$, $M1_2$, $C1_2$ and $Bk1_2$ having yellow, magenta, cyan and black colors, respectively, was prepared in exactly the same manner as in the preparation of Recording Ink $1_1$ composed of $Y1_1$, $M1_1$, $C1_1$ and $Bk1_1$ except that a styrene-acrylic acid copolymer (Johncryl 61J, trade name, product of Johnson Company, Ltd., Mw=10,000) was added in an amount of 0.5 part to the respective inks of Recording Ink $1_1$, and the amount of deionized water in each ink was controlled in such a manner that the total amount of the ink amounted to 100 parts.

(Preparation of Recording Ink $1_3$)

Recording ink $1_3$ composed of inks $Y1_3$, $M1_3$, $C1_3$ and $Bk1_3$ having yellow, magenta, cyan and black colors, respectively, was prepared in exactly the same manner as in the preparation of Recording Ink $1_1$ composed of $Y1_1$, $M1_1$, $C1_1$ and $Bk1_1$ except that an anionic surfactant (Emal D, trade name, product of Kao Corporation, sodium lauryl sulfate) was added in an amount of 1.0 part to the respective inks of Recording Ink $1_1$, and the amount of deionized water in each ink was controlled in such a manner that the total amount of the ink amounted to 100 parts.

(Preparation of Recording Ink $1_4$)

Yellow Ink $Y1_4$ of Recording Ink $1_4$:

An alkali-soluble resin (styrene-acrylic acid-ethyl acrylate; acid value: 160; weight average molecular weight: 8,000) was used as a dispersant to prepare the following dispersion for a yellow ink. Incidentally, monoethanolamine was used as a neutralizer for the alkali-soluble resin.

| | |
|---|---|
| Aqueous alkali-soluble resin solution $P1_1$ (solids content: 20%) | 35 parts |
| C.I. Pigment Yellow 86 | 24 parts |
| Triethylene glycol | 10 parts |
| Diethylene glycol | 10 parts |
| Ethylene glycol monobutyl ether | 1.0 part |
| Isopropyl alcohol | 0.5 part |
| Deionized water | 135 parts. |

The above components were charged in a batch-wise vertical sand mill (manufactured by Aimex Company), and glass beads having a diameter of 1 mm were charged as a grinding medium to conduct a dispersion treatment for 3 hours while cooling with water. The dispersion was centrifuged to remove coarse particles, thereby obtaining a dispersion having an average particle size of 100 μm.

After 100 parts of deionized water were added to the dispersion, the mixture was thoroughly stirred to obtain Yellow Ink $Y1_4$ of pH 9.5.

Cyan Ink $C1_4$ of Recording Ink $1_4$:

The same aqueous alkali-soluble resin solution $P1_1$ as that used in the preparation of $Y1_4$ was used. After the following components were mixed, a dispersion treatment was conducted under the same conditions as in the preparation of $Y1_4$.

| | |
|---|---|
| Aqueous alkali-soluble resin solution $P1_1$ (solids content: 20%) | 30 parts |
| C.I. Pigment Blue 15:3 | 24 parts |
| Triethylene glycol | 10 parts |
| Diethylene glycol | 10 parts |
| Ethylene glycol monobutyl ether | 1.0 part |
| Isopropyl alcohol | 3 parts |
| Deionized water | 135 parts. |

The thus-obtained dispersion had an average particle size of 120 nm.

After 100 parts of deionized water were added to the dispersion, the mixture was thoroughly stirred to obtain Cyan Ink $C1_4$ of pH 9.2.

Magenta Ink $M1_4$ of Recording Ink $1_4$:

The same aqueous alkali-soluble resin solution $P1_1$ as that used in the preparation of $Y1_4$ was used. After the following components were mixed, a dispersion treatment was conducted under the same conditions as in the preparation of $Y1_4$.

| | |
|---|---|
| Aqueous alkali-soluble resin solution $P1_1$ (solids content: 20%) | 20 parts |
| C.I. Pigment Red 122 | 24 parts |
| Glycerol | 15 parts |
| Isopropyl alcohol | 3 parts |
| Deionized water | 135 parts. |

The thus-obtained dispersion had an average particle size of 115 nm.

After 100 parts of deionized water were added to the dispersion, the mixture was thoroughly stirred to obtain Magenta Ink $M1_4$ of pH 9.4.

Black Ink $Bk1_1$ of Recording Ink $1_4$:

The following components were mixed and heated to 70° C. on a water bath, thereby completely dissolving a resin.

| | |
|---|---|
| Styrene-acrylic acid-ethyl acrylate copolymer (acid value: 160; weight average molecular weight: 8,000) | 1.5 parts |
| Monoethanolamine | 1.2 parts |
| Deionized water | 81.5 parts. |

To this solution, were added 10 parts of carbon black (MCF 88, product of Mitsubishi Chemical Industries Limited) and 1 part of isopropyl alcohol to premix them for 30 minutes. Thereafter, the resultant premix was subjected to a dispersion treatment under the following conditions:

| | |
|---|---|
| Dispersing machine: | Sand Grinder (manufactured by Igarashi Kikai K.K.) |
| Grinding medium: | zirconium beads |
| Packing rate of the grinding medium: | 50% (by volume) |
| Grinding time: | 3 hours. |

The dispersion was further subjected to a centrifugal treatment (12,000 rpm, 20 minutes) to remove coarse particles into a dispersion.

The following components were then mixed to obtain Black Ink $Bk1_4$ of pH 9.5.

| | |
|---|---|
| Dispersion described above | 30 parts |
| Glycerol | 10 parts |
| Ethylene glycol | 5 parts |
| N-Methylpyrrolidone | 5 parts |
| Isopropyl alcohol | 2 parts |
| Deionized water | 48 parts. |

(Preparation of Recording Ink $1_5$)

Inks of yellow, magenta, cyan and black colors were prepared in exactly the same manner as in the preparation of Recording Ink $1_4$ except that the dispersant in Recording Ink $1_4$ was changed to an equiamount of polyvinyl pyrrolidone PVP K-15 (product of International Specialty Chemicals, Mw=7,000).

Then, an anionic surfactant (Emal D, trade name, product of Kao Corporation, sodium lauryl sulfate) was added to the thus-obtained inks in a proportion of 1.0 part per 100 parts of the respective inks, and the resultant mixtures were thoroughly mixed, thereby obtaining Recording Ink $1_5$ composed of inks $Y1_5$, $M1_5$, $C1_5$ and $Bk1_5$ having yellow, magenta, cyan and black colors, respectively.

Using the combinations of the thus-obtained liquid compositions and recording inks as ink sets, recording was then conducted on Canon PPC paper. As an ink-jet recording apparatus, was used a recording apparatus similar to that shown in FIG. 4. Color images were formed using 5 recording heads as illustrated in FIG. 7. Incidentally, the individual recording heads used had a recording density of 360 dpi, and were driven with a drive frequency of 5 kHz. In view of the ejection volume per dot, heads from which an ink can be ejected at a rate of 40 pl/dot was used for the yellow, magenta and cyan inks and the liquid compositions, while a head from which an ink can be ejected at a rate of 80 pl/dot was used for the black inks using a dye as a coloring material, or a head from which an ink can be ejected at a rate of 60 pl/dot was used for the black inks using a pigment as a coloring material.

Printing was performed in accordance with the combinations of the colorless or pale-colored liquid compositions and the recording inks and their printing order shown in Table 1.

TABLE 1

| Example | Liquid composition | Ink | Printing process |
|---|---|---|---|
| 1 | $I_A$ | $1_1$ | Ejecting $I_A$ first |
| 2 | $I_A$ | $1_1$ | Ejecting $I_A$ later |
| 3 | $I_B$ | $1_1$ | Ejecting $I_B$ first |

TABLE 1-continued

| Example | Liquid composition | Ink | Printing process |
|---|---|---|---|
| 4 | $I_B$ | $1_1$ | Ejecting $I_B$ later |
| 5 | $I_B$ | $1_4$ | Ejecting $I_B$ first |
| 6 | $I_B$ | $1_4$ | Ejecting $I_B$ later |
| 7 | $I_C$ | $1_1$ | Ejecting $I_C$ first |
| 8 | $I_C$ | $1_1$ | Ejecting $I_C$ later |
| 9 | $I_C$ | $1_4$ | Ejecting $I_C$ first |
| 10 | $I_C$ | $1_4$ | Ejecting $I_C$ later |
| 11 | $I_D$ | $1_1$ | Ejecting $I_D$ first |
| 12 | $I_D$ | $1_1$ | Ejecting $I_D$ later |
| 13 | $I_D$ | $1_4$ | Ejecting $I_D$ first |
| 14 | $I_D$ | $1_4$ | Ejecting $I_D$ later |
| 15 | $I_E$ | $1_1$ | Ejecting $I_E$ first |
| 16 | $I_E$ | $1_1$ | Ejecting $I_E$ later |
| 17 | $I_E$ | $1_4$ | Ejecting $I_E$ first |
| 18 | $I_E$ | $1_4$ | Ejecting $I_E$ later |
| 19 | $I_F$ | $1_1$ | Ejecting $I_F$ first |
| 20 | $I_F$ | $1_1$ | Ejecting $I_F$ later |
| 21 | $I_F$ | $1_2$ | Ejecting $I_F$ first |
| 22 | $I_F$ | $1_2$ | Ejecting $I_F$ later |
| 23 | $I_F$ | $1_3$ | Ejecting $I_F$ first |
| 24 | $I_F$ | $1_3$ | Ejecting $I_F$ later |
| 25 | $I_F$ | $1_4$ | Ejecting $I_F$ first |
| 26 | $I_F$ | $1_4$ | Ejecting $I_F$ later |
| 27 | $I_F$ | $1_5$ | Ejecting $I_F$ first |
| 28 | $I_F$ | $1_5$ | Ejecting $I_F$ later |
| 29 | $I_G$ | $1_1$ | Ejecting $I_G$ first |
| 30 | $I_G$ | $1_1$ | Ejecting $I_G$ later |
| 31 | $I_G$ | $1_2$ | Ejecting $I_G$ first |
| 32 | $I_G$ | $1_2$ | Ejecting $I_G$ later |
| 33 | $I_G$ | $1_3$ | Ejecting $I_G$ first |
| 34 | $I_G$ | $1_3$ | Ejecting $I_G$ later |
| 35 | $I_G$ | $1_4$ | Ejecting $I_G$ first |
| 36 | $I_G$ | $1_4$ | Ejecting $I_G$ later |
| 37 | $I_G$ | $1_5$ | Ejecting $I_G$ first |
| 38 | $I_G$ | $1_5$ | Ejecting $I_G$ later |
| 39 | $I_H$ | $1_1$ | Ejecting $I_H$ first |
| 40 | $I_H$ | $1_1$ | Ejecting $I_H$ later |
| 41 | $I_H$ | $1_4$ | Ejecting $I_H$ first |
| 42 | $I_H$ | $1_4$ | Ejecting $I_H$ later |

The resultant recorded images were evaluated in accordance with the following methods.

1. Image Density:

After a solid image was formed with the combination of the liquid composition and the black ink in each ink set and left over for 12 hours, its reflection density was measured by a reflection densitometer, Macbeth RD915 (manufactured by Macbeth Company) and ranked in accordance with the following standard:

AA: Reflection density was not lower than 1.30;

A: Reflection density was not lower than 1.25 but lower than 1.30;

B: Reflection density was not lower than 1.15 but lower than 1.25;

C: Reflection density was lower than 1.15.

2. Fixing Ability:

After a solid print image of a red color was formed with the combination of the liquid composition and the yellow and magenta inks in each ink set, another white paper sheet was placed on the recorded image by its own weight, thereby measuring the time required until the recorded image no longer transferred to the back side of the paper sheet and no greasing occurred assuming that the time the recording was completed was zero. The time measured was used as a measure of the fixing ability to rank it in accordance with the following standard:

AA: Shorter than 20 seconds;

A: Not shorter than 20 but shorter than 30 seconds;

B: Not shorter than 30 but shorter than 40 seconds;

C: Not shorter than 40.

3. Quality of Character:

Black English characters and numerals were printed with the combination of the liquid composition and the black ink in each ink set to visually evaluate the quality of character. The quality of character was ranked as AA where feathering was scarcely conspicuous, A where feathering was somewhat conspicuous, but no problem arose from the viewpoint of practical use, or C where the level was lower than the above.

4. Resistance to Bleeding:

Solid print images of yellow, magenta, cyan and black colors were printed in contiguity with one another with the combinations of the liquid composition and the yellow, magenta, cyan and black inks in each ink set in accordance with the same printing mode as the printing mode E (1 pass, one-direction printing) in a Color Bubble Jet Printer BJC-820 (trade name, manufactured by Canon Inc.), thereby visually observing the degree of bleeding at portions of boundaries between the inks of different colors. The resistance to bleeding was ranked as AA where bleeding scarcely occurred, A where bleeding slightly occurred, but no problem arose from the viewpoint of practical use, or C where the level was lower than the above.

5. Water Fastness:

After solid print images and English characters and numerals of yellow, magenta, cyan and black colors were printed with the combinations of the liquid composition and the yellow, magenta, cyan and black inks in each ink set, and the resulting print samples were left over for 1 hour, they were immersed for 10 seconds in tap water of 20° C. Thereafter, they were taken out of the water, and filter paper was lightly pressed against the print samples to remove water from the surfaces of the recorded images. The print samples were then air-dried as they are to visually evaluate the images in water fastness. Among the yellow, magenta, cyan and black inks, the ink poorest in water fastness was taken as the evaluation result of water fastness. The water fastness was ranked in accordance with the following standard:

AA: No ink running toward the blank portion of the recording medium occurred, greasing was scarcely recognized, and blurring of the English characters and numerals also scarcely occurred;

A: Ink running toward the blank portion of the recording medium slightly occurred, and the English characters and numerals were somewhat blurred, but no problem arose from the viewpoint of practical use;

C: Ink running toward the blank portion of the recording medium occurred to a significant extent, greasing was also markedly recognized, and marked blurring of the English characters and numerals also occurred.

In all the above examples and following comparative examples, a region of the recording medium, to which the liquid composition is applied, corresponds to the image-forming region with the inks. The printing duty is 100% in each of the liquid compositions and the inks. The results of the evaluation as to the print samples in Examples 1 to 42 are shown collectively in Table 2.

COMPARATIVE EXAMPLES 1 TO 5

Printing tests and evaluation were performed in exactly the same manner as in Examples 1 to 42 except that Inks $1_1$ to $1_5$ were separately used, but no liquid composition was used. The results are shown in Table 3.

COMPARATIVE EXAMPLE 6

A colorless or pale-colored Liquid composition composed of the following components was prepared, and printing tests and evaluation were conducted in the same manner as in Examples 1 to 42 except that this liquid composition and the same inks as those used in Example 1 were used.

| | |
|---|---|
| Benzyltributylammonium chloride | 1.5 parts |
| Thiodiglycol | 10 parts |
| Surfactant (Acetylenol EH, product of Kawaken Fine Chemicals Co., Ltd.) | 0.5 part |
| Deionized water | 88 parts |

The results are shown in Table 3.

TABLE 2

| Ex. | Image density | Fixing ability | Quality of character | Resistance to bleeding | Water fastness |
|---|---|---|---|---|---|
| 1 | A | A | A | A | A |
| 2 | A | A | A | A | A |
| 3 | AA | AA | AA | AA | A |
| 4 | AA | A | A | A | A |
| 5 | AA | A | AA | AA | AA |
| 6 | AA | A | A | AA | AA |
| 7 | AA | AA | AA | AA | A |
| 8 | AA | A | A | A | A |
| 9 | AA | A | AA | AA | AA |
| 10 | AA | A | A | AA | AA |
| 11 | AA | AA | AA | AA | A |
| 12 | AA | A | A | A | AA |
| 13 | AA | A | AA | AA | AA |
| 14 | AA | A | A | AA | A |
| 15 | A | A | A | A | A |
| 16 | A | A | A | A | A |
| 17 | A | A | AA | AA | AA |
| 18 | A | A | A | AA | AA |
| 19 | AA | AA | AA | AA | A |
| 20 | AA | A | A | A | A |
| 21 | AA | A | A | AA | AA |
| 22 | AA | A | A | AA | AA |
| 23 | AA | AA | AA | AA | AA |
| 24 | AA | AA | A | AA | AA |
| 25 | AA | A | AA | AA | AA |
| 26 | AA | A | A | AA | AA |
| 27 | AA | AA | AA | AA | AA |
| 28 | AA | AA | AA | A | AA |
| 29 | AA | A | AA | AA | A |
| 30 | AA | A | A | A | A |
| 31 | AA | A | AA | AA | AA |
| 32 | AA | A | A | A | AA |
| 33 | AA | AA | AA | AA | AA |
| 34 | AA | AA | A | A | AA |
| 35 | AA | A | AA | AA | AA |
| 36 | AA | A | A | AA | AA |
| 37 | AA | AA | AA | AA | AA |
| 38 | AA | AA | A | AA | AA |
| 39 | A | AA | AA | AA | A |
| 40 | A | AA | A | A | A |
| 41 | AA | A | AA | AA | AA |
| 42 | AA | A | A | AA | AA |

TABLE 3

| Comp. Ex. | Image density | Fixing ability | Quality of character | Resistance to bleeding | Water fastness |
|---|---|---|---|---|---|
| 1 | AA | B | AA | C | C |
| 2 | AA | B | AA | C | C |
| 3 | B | AA | C | C | C |
| 4 | C | C | AA | C | AA |
| 5 | C | C | AA | C | AA |
| 6 | B | B | C | C | C |

The present invention will hereinafter be described in more detail by other examples and comparative examples. Incidentally, the weight average molecular weights of the dispersants in the pigment inks in the following examples were determined by the GPC method using a styrene polymer as a standard.

EXAMPLE 43

The following components were first mixed into a solution, and the resultant solution was then filtered under pressure through a membrane filter (Fluoropore Filter, trade name: product of Sumitomo Electric Industries, Ltd.) having a pore size of 0.22 μm, thereby obtaining a colorless Liquid Composition $II_A$ the pH of which was adjusted to 4.8.

Components of Liquid Composition $II_A$:

| | |
|---|---|
| Polyallylamine hydrochloride (peak of molecular weight distribution in terms of polyoxyethylene oxide: 800) | 5.0 parts |
| Nonionic polymer, PVP-K-15 (polyvinyl pyrrolidone, Mw = 7,000) | 5.0 parts |
| Thiodiglycol | 10.0 parts |
| Deionized water | 80.0 parts. |

(Preparation of Ink $2_1$)

The following respective components were then mixed into solutions, and the resultant solutions were separately filtered under pressure through a membrane filter (Fluoropore Filter, trade name: product of Sumitomo Electric Industries, Ltd.) having a pore size of 0.22 μm, thereby obtaining a yellow ink $Y2_1$, a magenta ink $M2_1$, a cyan ink $C2_1$ and a black ink $Bk2_1$, which were adjusted to pH 4.8 and contained their corresponding dyes having an anionic group. These inks were called Ink $2_1$ collectively.

Yellow Ink $Y2_1$:

| | |
|---|---|
| C.I. Direct Yellow 86 | 2 parts |
| Thiodiglycol | 10 parts |
| EO adduct of acetylene glycol (Acetylenol EH, product of Kawaken Fine Chemicals Co., Ltd.) | 0.05 part |
| Deionized water | 87.95 parts. |

Magenta Ink $M2_1$:

| | |
|---|---|
| C.I. Acid Red 289 | 2.5 parts |
| Thiodiglycol | 10 parts |
| EO adduct of acetylene glycol (Acetylenol EH, product of Kawaken Fine Chemicals Co., Ltd.) | 0.05 part |
| Deionized water | 87.45 parts. |

Cyan Ink $C2_1$:

| | |
|---|---|
| C.I. Direct Blue 199 | 2.5 parts |
| Thiodiglycol | 10 parts |
| EO adduct of acetylene glycol (Acetylenol EH, product of Kawaken Fine Chemicals Co., Ltd.) | 0.05 part |
| Deionized water | 87.45 parts. |

Black Ink Bk2

| | |
|---|---|
| C.I. Food Black 2 | 4.0 parts |
| Thiodiglycol | 10 parts |
| EO adduct of acetylene glycol (Acetylenol EH, product of Kawaken Fine Chemicals Co., Ltd.) | 0.05 part |
| Deionized water | 85.95 parts. |

Using, as an ink set, the combination of the thus-obtained Liquid Composition $II_A$ and Ink $2_1$ according to this example, recording was then conducted on PPC paper (product of Canon Inc.). As an ink-jet recording apparatus, was used a recording apparatus similar to that shown in FIG. 4. Color images were formed using 5 recording heads as illustrated in FIG. 7. In this recording, Liquid Composition $II_A$ was first ejected to apply it to the recording paper in advance, after which Ink $2_1$ was applied. Incidentally, individual recording heads used in this example had a recording density of 360 dpi, and were driven with a drive frequency of 5 kHz. In view of the ejection volume per dot, heads from which an ink can be ejected at a rate of 40 pl/dot was used for the yellow, magenta and cyan inks and the liquid composition, while a head from which an ink can be ejected at a rate of 80 pl/dot was used for the black ink.

Incidentally, these recording conditions are the same throughout examples and comparative examples, which will be described subsequently and use inks containing a dye. The environmental conditions upon printing tests were controlled to 25° C. and 55% RH.

EXAMPLE 44

Recording was conducted under the same conditions as those in Example 43 except that the combination of Liquid Composition $II_A$ and Ink $2_1$ using a dye as a coloring material, which had been used in Example 43, was used as an ink set according to this example, and Ink $2_1$ was first applied to the recording paper and Liquid Composition $II_A$ was then ejected.

EXAMPLE 45

Liquid Composition $II_B$ of this example composed of the following components was first prepared in the same manner as in the preparation of Liquid Composition $II_A$ according to Example 43.
Components of Liquid Composition $II_B$:

| | |
|---|---|
| Cationic oligomer represented by the following formula (peak of molecular weight distribution in terms of polyoxyethylene oxide: 900) | 5.0 parts |

$$C_{18}H_{37}-\underset{\underset{(C_2H_4O)_nH}{|}}{\overset{\overset{(C_2H_4O)_mH}{|}}{N}}-CH_2C_6H_5$$

| | |
|---|---|
| Nonionic polymer, PVP-K-15 (polyvinyl pyrrolidone, Mw = 7,000) | 5.0 parts |
| Thiodiglycol | 10.0 parts |
| Deionized water | 80.0 parts. |

(Preparation of Ink $2_2$)

Ink $2_2$ composed of inks $Y2_2$, $M2_2$, $C2_2$ and $Bk2_2$ having yellow, magenta, cyan and black colors, respectively, and containing their corresponding dyes having an anionic group was prepared in the same manner as in the preparation of Ink $2_1$ of Example 43 except that an anionic polymeric substance (Johncryl 61J, styrene-acrylic acid copolymer, Mw=10,000, product of Johnson Company, Ltd.) was added in an amount of 1.0 part to the respective components of Ink $2_1$ used in Example 43, and the amount of water in each ink was controlled in such a manner that the total amount of the components amounted to 100 parts.

Using, as an ink set, the combination of the thus-prepared Liquid Composition $II_B$ and Ink $2_2$ according to this example, recording was then conducted on PPC paper (product of Canon Inc.) under the same conditions as in Example 43. In this example, also, Liquid Composition $II_B$ was first ejected to apply it to the recording paper in advance, after which Ink $2_2$ was applied to conduct the recording.

EXAMPLE 46

Recording was conducted under the same conditions as those in Example 43 except that the combination of Liquid Composition $II_B$ and Ink $2_2$ using a dye as a coloring material, both, used in Example 45, was used as an ink set according to this example, and Ink $2_2$ was first applied to the recording paper and Liquid Composition $II_B$ was then ejected.

EXAMPLE 47

Liquid Composition $II_C$ of this example composed of the following components was first prepared in the same manner as in the preparation of Liquid Composition $II_A$ according to Example 43.
Components of Liquid Composition $II_C$:

| | |
|---|---|
| Polyallylamine hydrochloride (peak of molecular weight distribution in terms of polyoxyethylene oxide: 800) | 5.0 parts |
| Nonionic polymer, PVP-K-15 (polyvinyl pyrrolidone, Mw = 7,000) | 5.0 parts |
| Thiodiglycol | 10.0 parts |
| Benzalkonium chloride represented by the following formula | 3.0 parts |

$$[C_{12}H_{25}-\overset{\oplus}{N}(CH_3)_2CH_2-\!\!\!\left\langle\!\!\bigcirc\!\!\right\rangle\!]Cl^{\ominus}$$

| | |
|---|---|
| Deionized water | 77.0 parts. |

Using, as an ink set, the combination of the thus-prepared Liquid Composition $II_C$ according to this example, and Ink $2_1$ using a dye as a coloring material, which had been used in Example 43, recording was then conducted on PPC paper (product of Canon Inc.) under the same conditions as in Example 43. In this example, also, Liquid Composition $II_C$ was first ejected to apply it to the recording paper in advance, after which Ink $2_1$ was applied to conduct the recording.

EXAMPLE 48

Recording was conducted under the same conditions as those in Example 43 except that the combination of Liquid Composition $II_C$ and Ink $2_1$ using a dye as a coloring material, both, used in Example 47, was used as an ink set according to this example, and Ink $2_1$ was first applied to the recording paper and Liquid Composition $II_C$ was then ejected.

EXAMPLE 49

Recording was conducted under the same conditions as those in Example 43 except that the combination of Liquid Composition $II_C$ used in Example 47, and Ink $2_2$ using a dye as a coloring material, which had been used in Example 45, was used as an ink set according to this example, and Liquid Composition $II_C$ was first applied to the recording paper and Ink $2_2$ was then applied.

EXAMPLE 50

Recording was conducted under the same conditions as those in Example 43 except that the combination of Liquid Composition $II_C$ used in Example 47, and Ink $2_2$ using a dye as a coloring material, which had been used in Example 45, was used as an ink set according to this example, and Ink $2_2$ was first applied to the recording paper and Liquid Composition $II_C$ was then ejected.

EXAMPLE 51

Recording was conducted under the same conditions as those in Example 43 except that the combination of Liquid Composition $II_C$ used in Example 47, and Ink $2_3$ using a dye as a coloring material and obtained in the following manner was used as an ink set according to this example, and Liquid Composition $II_C$ was first applied to the recording paper and Ink $2_3$ was then applied.

(Preparation of Ink $2_3$)

Ink $2_3$ composed of inks $Y2_3$, $M2_3$, $C2_3$ and $Bk2_3$ having yellow, magenta, cyan and black colors, respectively, and containing their corresponding dyes having an anionic group was prepared in the same manner as in the preparation of Ink $2_1$ of Example 43 except that an anionic surfactant (Emal D, sodium lauryl sulfate, product of Kao Corporation) was added in an amount of 1.0 part to the respective components of Ink $2_1$ used in Example 43, and the amount of deionized water in each ink was controlled in such a manner that the total amount of the components amounted to 100 parts.

EXAMPLE 52

Recording was conducted under the same conditions as those in Example 43 except that the combination of Liquid Composition $II_C$ used in Example 47, and Ink $2_3$ using a dye as a coloring material, which had been used in Example 51, was used as an ink set according to this example, and Ink $2_3$ was first applied to the recording paper and Liquid Composition $II_C$ was then ejected.

EXAMPLE 53

Liquid Composition $II_D$ of this example composed of the following components was first prepared in the same manner as in the preparation of Liquid Composition $II_A$ according to Example 43.

Components of liquid composition $II_D$:

| | |
|---|---|
| Cationic oligomer represented by the following formula (peak of molecular weight distribution in terms of polyoxyethylene oxide: 900) | 5.0 parts |

$C_{18}H_{37}-\underset{\underset{(C_2H_4O)_nH}{|}}{\overset{\overset{(C_2H_4O)_mH}{|}}{N}}-CH_2C_6H_5$

| | |
|---|---|
| Nonionic polymer, PVP-K-15 (polyvinyl pyrrolidone, Mw = 7,000) | 5.0 parts |
| Thiodiglycol | 10.0 parts |
| Benzalkonium chloride represented by the following formula | 3.0 parts |

$[C_{12}H_{25}-\overset{\oplus}{N}(CH_3)_2CH_2-\langle\bigcirc\rangle]Cl^{\ominus}$

| | |
|---|---|
| Deionized water | 77.0 parts. |

Using, as an ink set, the combination of the thus-prepared liquid composition $II_D$ according to this example, and Ink $2_1$ using a dye as a coloring material, which had been used in Example 43, recording was then conducted on PPC paper (product of Canon Inc.) under the same conditions as in Example 43. In this example, also, Liquid Composition $II_D$ was first ejected to apply it to the recording paper in advance, after which Ink $2_1$ was applied to conduct the recording.

EXAMPLE 54

Recording was conducted under the same conditions as those in Example 43 except that the combination of Liquid Composition $II_D$ and Ink $2_1$ using a dye as a coloring material, both, used in Example 53, was used as an ink set according to this example, and Ink $2_1$ was first applied to the recording paper and Liquid Composition $II_D$ was then ejected.

EXAMPLE 55

Recording was conducted under the same conditions as those in Example 43 except that the combination of Liquid Composition $II_D$ used in Example 53, and Ink $2_2$ using a dye as a coloring material, which had been used in Example 45, was used as an ink set according to this example, and Liquid Composition $II_D$ was first applied to the recording paper and Ink $2_2$ was then applied.

EXAMPLE 56

Recording was conducted under the same conditions as those in Example 43 except that the combination of Liquid Composition $II_D$ used in Example 53, and Ink $2_2$ using a dye as a coloring material, which had been used in Example 45, was used as an ink set according to this example, and Ink $2_2$ was first applied to the recording paper and Liquid Composition $II_D$ was then ejected.

EXAMPLE 57

Recording was conducted under the same conditions as those in Example 43 except that the combination of Liquid Composition $II_D$ used in Example 53, and Ink $2_3$ using a dye as a coloring material, which had been used in Example 51, was used as an ink set according to this example, and Liquid Composition $II_D$ was first applied to the recording paper and Ink $2_3$ was then applied.

EXAMPLE 58

Recording was conducted under the same conditions as those in Example 43 except that the combination of Liquid Composition $II_D$ used in Example 53, and Ink $2_3$ using a dye as a coloring material, which had been used in Example 45, was used as an ink set according to this example, and Ink $2_3$ was first applied to the recording paper and Liquid Composition $II_D$ was then ejected.

EXAMPLE 59

Inks $Y2_4$, $M2_4$, $C2_4$ and $Bk2_4$ having yellow, magenta, cyan and black colors, respectively, and containing their corresponding pigments and an anionic compound were prepared in the following manner. These inks were called Ink $2_4$ collectively. An ink set of this example was prepared from Ink $2_4$ and Liquid Composition $II_C$ used in Example 47. Using this ink set, recording was conducted on PPC paper (product of Canon Inc.). In this example, Liquid Composition $II_C$ was first ejected to apply it to the recording paper in advance, after which Ink $2_4$ was applied to conduct the recording.

Individual recording heads used in this example had a recording density of 360 dpi, and were driven with a drive frequency of 5 kHz. In view of the ejection volume per dot, heads from which an ink can be ejected at a rate of 40 pl/dot was used for the yellow, magenta and cyan inks while the liquid composition, while a head from which an ink can be ejected at a rate of 60 pl/dot was used for the black ink.

Incidentally, these recording conditions are the same throughout examples, which will be described subsequently and use inks containing a pigment. The environmental conditions upon printing tests were controlled to 25° C. and 55% RH.

(Preparation Ink $2_4$)
Black Ink $Bk2_4$:
(Preparation of Pigment Dispersion)

| | |
|---|---|
| Styrene-acrylic acid-ethyl acrylate copolymer (acid value: 140, weight average molecular weight: 5,000) | 1.5 parts |
| Monoethanolamine | 1 part |
| Diethylene glycol | 5 parts |
| Deionized water | 81.5 parts |

The above components were mixed, and heated to 70° C. on a water bath to completely dissolve the resin. To this solution, were added 10 parts of carbon black (MCF 88, product of Mitsubishi Chemical Industries Limited) and 1 part of isopropyl alcohol to premix them for 30 minutes. Thereafter, the resulting premix was subjected to a dispersion treatment under the following conditions:

| | |
|---|---|
| Dispersing machine: | Sand Grinder (manufactured by Igarashi Kikai K.K.) |
| Grinding medium: | zirconium beads (diameter: 1 mm) |
| Packing rate of the grinding medium: | 50% (by volume) |
| Grinding time: | 3 hours. |

The dispersion was further subjected to a centrifugal treatment (12,000 rpm, 20 minutes) to remove coarse particles into a dispersion.
(Preparation of Black Ink)
The above-prepared dispersion was used, and components of the following compositional proportion were mixed to prepare an ink containing the pigment, thereby providing this ink as Black Ink $Bk2_4$.

| | |
|---|---|
| Dispersion described above | 30.0 parts |
| Glycerol | 10.0 parts |
| Ethylene glycol | 5.0 parts |
| N-Methylpyrrolidone | 5.0 parts |
| Isopropyl alcohol | 2.0 parts |
| Deionized water | 48.0 parts. |

Yellow Ink $Y2_4$:

Yellow Ink $Y2_4$ containing a pigment was prepared in the same manner as in the preparation of Black Ink $Bk2_4$ except that 10 parts of carbon black (MCF 88, product of Mitsubishi Chemical Industries Limited) used in the preparation of Black Ink $Bk2_4$ were changed to Pigment Yellow 74.

Magenta Ink $M2_4$:

Magenta Ink $M2_4$ containing a pigment was prepared in the same manner as in the preparation of Black Ink $Bk2_4$ except that 10 parts of carbon black (MCF 88, product of Mitsubishi Chemical Industries Limited) used in the preparation of Black Ink $Bk2_4$ were changed to Pigment Red 7.

Cyan Ink $C2_4$:

Cyan Ink $C2_4$ containing a pigment was prepared in the same manner as in the preparation of Black Ink $Bk2_4$ except that 10 parts of carbon black (MCF 88, product of Mitsubishi Chemical Industries Limited) used in the preparation of Black Ink $Bk2_4$ were changed to Pigment Blue 15.

EXAMPLE 60

Recording was conducted under the same conditions as those in Example 59 except that the combination of Liquid Composition $II_C$ used in Example 47, and Ink $2_4$ using a pigment as a coloring material, which had been used in Example 59, was used as an ink set according to this example, and Ink $2_4$ was first applied to the recording paper and Liquid Composition $II_C$ was then ejected.

EXAMPLE 61

Recording was conducted under the same conditions as those in Example 59 except that the combination of Liquid Composition $II_D$ used in Example 53, and Ink $2_4$ using a pigment as a coloring material, which had been used in Example 59, was used as an ink set according to this example, and Liquid Composition $II_D$ was first applied to the recording paper and Ink $2_4$ was then applied.

EXAMPLE 62

Recording was conducted under the same conditions as those in Example 59 except that the combination of Liquid Composition $II_D$ used in Example 53, and Ink $2_4$ using a pigment as a coloring material, which had been used in Example 59, was used as an ink set according to this example, and Ink $2_4$ was first applied to the recording paper and Liquid Composition $II_D$ was then ejected.

[Evaluation]

The recorded images obtained in Examples 43 to 62, which are summarized in Table 4, were evaluated in accordance with the methods described above. The results are shown collectively in Table 5.

TABLE 4

| Example | Liquid composition | Ink | Printing process |
|---|---|---|---|
| 43 | $II_A$ | $2_1$ | Ejecting $II_A$ first |
| 44 | $II_A$ | $2_1$ | Ejecting $II_A$ later |
| 45 | $II_B$ | $2_2$ | Ejecting $II_B$ first |
| 46 | $II_B$ | $2_2$ | Ejecting $II_B$ later |
| 47 | $II_C$ | $2_1$ | Ejecting $II_C$ first |
| 48 | $II_C$ | $2_1$ | Ejecting $II_C$ later |
| 49 | $II_C$ | $2_2$ | Ejecting $II_C$ first |
| 50 | $II_C$ | $2_2$ | Ejecting $II_C$ later |
| 51 | $II_C$ | $2_3$ | Ejecting $II_C$ first |
| 52 | $II_D$ | $2_3$ | Ejecting $II_D$ later |
| 53 | $II_D$ | $2_1$ | Ejecting $II_D$ first |
| 54 | $II_D$ | $2_1$ | Ejecting $II_D$ later |
| 55 | $II_D$ | $2_2$ | Ejecting $II_D$ first |
| 56 | $II_D$ | $2_2$ | Ejecting $II_D$ later |
| 57 | $II_D$ | $2_3$ | Ejecting $II_D$ first |
| 58 | $II_D$ | $2_3$ | Ejecting $II_D$ later |
| 59 | $II_C$ | $2_4$ | Ejecting $II_C$ first |
| 60 | $II_C$ | $2_4$ | Ejecting $II_C$ later |
| 61 | $II_D$ | $2_4$ | Ejecting $II_D$ first |
| 62 | $II_D$ | $2_4$ | Ejecting $II_D$ later |

TABLE 5

| | | | Evaluation results | | |
|---|---|---|---|---|---|
| Ex. | Image density | Fixing ability | Quality of character | Resistance to bleeding | Water fastness |
| 43 | AA | A | AA | AA | AA |
| 44 | AA | A | A | A | AA |
| 45 | AA | AA | AA | AA | AA |
| 46 | AA | AA | A | A | AA |
| 47 | A | AA | AA | AA | AA |
| 48 | A | AA | A | A | AA |
| 49 | AA | AA | AA | AA | AA |
| 50 | AA | AA | A | A | AA |
| 51 | A | AA | A | AA | AA |
| 52 | A | AA | A | A | AA |
| 53 | A | AA | A | AA | AA |
| 54 | A | AA | AA | A | AA |
| 55 | AA | AA | A | AA | AA |
| 56 | AA | AA | A | A | AA |
| 57 | A | AA | A | AA | AA |
| 58 | A | AA | A | A | AA |
| 59 | AA | A | AA | AA | AA |
| 60 | AA | A | AA | A | AA |
| 61 | AA | A | AA | AA | AA |
| 62 | AA | A | AA | A | AA |

As apparent from Table 5, images excellent in all the fixing ability, quality of character, image density, resistance to bleeding and water fastness were obtained in the examples, while only images low in the density and poor in the quality of character were provided in Comparative Example 6. These images were poor even in the water fastness.

EXAMPLE 63

Using Liquid Composition $II_A$ used in Example 43 and 3 inks of Yellow Ink $Y2_1$, Magenta Ink $M2_1$ and Cyan Ink $C2_1$ in Ink $2_1$ used in Example 43, a solid print image was recorded with each duty controlled to 100%, thereby forming an image of the so-called process black. The conditions for the printing were exactly the same as those in Example 43. In this case, the results of the evaluation as to the image density, fixing ability, quality of character and bleeding at portions of boundaries between the image of the process black and images of other colors were all good. Therefore, it was confirmed that the present invention is effective.

The present invention will hereinafter be described in more detail by further examples and comparative examples.

EXAMPLES 64 TO 109

[Preparation of Colorless of Pale-colored Liquid Composition]

The following respective components were mixed into solutions, and the resultant solutions were then filtered under pressure through a membrane filter (Fluoropore Filter, trade name: product of Sumitomo Electric Industries, Ltd.) having a pore size of 0.22 μm, thereby obtaining colorless or pale-colored Liquid Compositions $III_A$ through $III_G$.

Composition of Liquid Composition $III_A$:

| | |
|---|---|
| Stearyltrimethylammonium chloride (Electrostripper QE, trade name, product of Kao Corporation) | 2 parts |
| Polyamine sulfone hydrochloride (PAS-A-5, trade name, product of Nitto Boseki Co., Ltd., peak of molecular weight distribution: 2,000) | 10 parts |
| Thiodiglycol | 10 parts |
| Deionized water | 78 parts. |

Composition of Liquid Composition $III_B$:

| | |
|---|---|
| Stearyltrimethylammonium chloride (Electrostripper QE, trade name, product of Kao Corporation) | 2 parts |
| Polyamine sulfone hydrochloride (PAS-A-5, trade name, product of Nitto Boseki Co., Ltd., peak of molecular weight distribution: 3,500) | 6 parts |
| Thiodiglycol | 10 parts |
| Deionized water | 82 parts. |

Composition of Liquid Composition $III_C$:

| | |
|---|---|
| Stearyltrimethylammonium chloride (Electrostripper QE, trade name, product of Kao Corporation) | 2 parts |
| Polyamine sulfone hydrochloride (PAS-92, trade name, product of Nitto Boseki Co., Ltd., peak of molecular weight distribution: 5,000) | 4 parts |
| Thiodiglycol | 10 parts |
| Deionized water | 84 parts. |

Composition of Liquid Composition $III_D$:

| | |
|---|---|
| Stearyltrimethylammonium chloride (Electrostripper QE, trade name, product of Kao Corporation) | 2 parts |
| Polyallylamine hydrochloride (synthesized in our company, peak of molecular weight distribution: 8,500) | 3 parts |
| Thiodiglycol | 10 parts |
| Deionized water | 85 parts. |

(*) The polyallylamine was synthesized in accordance with the method described in "Kino Zairyo (Functional Material)", Vol. 5, 29 (1986). The same shall apply to the following examples.

Composition of Liquid Composition III$_E$:

| | |
|---|---|
| Polyallylamine (synthesized in our company, peak of molecular weight distribution: 800) | 3 parts |
| Polyamine sulfone hydrochloride (PAS-A-1, trade name, product of Nitto Boseki Co., Ltd., peak of molecular weight distribution: 2,000) | 10 parts |
| Thiodiglycol | 10 parts |
| Deionized water | 77 parts. |

(*) The polyallylamine oligomer was also synthesized in accordance with the method described in "Kino Zairyo (Functional Material)", Vol. 5, 29 (1986). The same shall apply to the following examples.

Composition of Liquid Composition III$_F$:

| | |
|---|---|
| Polyallylamine (synthesized in our company, peak of molecular weight distribution: 650) | 5 parts |
| Polyallylamine hydrochloride (synthesized in our company, peak of molecular weight distribution: 8,500) | 3 parts |
| Thiodiglycol | 10 parts |
| Deionized water | 82 parts. |

Composition of Liquid Composition III$_G$:

| | |
|---|---|
| Benzyltri-n-butylammonium chloride (product of Tokyo Kasei Kogyo Co., Ltd., reagent grade) | 3 parts |
| Polyallylamine hydrochloride (synthesized in our company, peak of molecular weight distribution: 8,500) | 3 parts |
| Thiodiglycol | 10 parts |
| Deionized water | 84 parts. |

[Preparation of Recording Ink]
(Preparation of Recording Ink 3$_1$)

The following respective components were mixed and then filtered under pressure through a membrane filter (Fluoropore Filter, trade name: product of Sumitomo Electric Industries, Ltd.) having a pore size of 0.22 μm, thereby obtaining Recording Ink 3$_1$ composed of yellow, magenta, cyan and black inks.

Yellow Ink Y3 of Recording Ink 3$_1$:

| | |
|---|---|
| C.I. Direct Yellow 142 | 2 parts |
| Thiodiglycol | 10 parts |
| Acetylenol EH (EO adduct of acetylene glycol, product of Kawaken Fine Chemicals Co., Ltd.) | 0.05 part |
| Deionized water | 87.95 parts. |

Cyan Ink C3$_1$ of Recording Ink 3$_1$:

The same composition as that of Yellow Ink Y3$_1$ except that C.I. Direct Yellow 142 in Y3$_1$ was changed to 2.5 parts of C.I. Direct Blue 199, and the amount of deionized water was changed to 87.45 parts.

Magenta Ink M3$_1$ of Recording Ink 3$_1$:

The same composition as that of Cyan Ink C3$_1$ except that C.I. Direct Blue 199 in C3$_1$ was changed to 2.5 parts of C.I. Acid Red 92.

Black Ink Bk3$_1$ of Recording Ink 3$_1$:

The same composition as that of Magenta Ink M3$_1$ except that 2.5 parts of C.I. Acid Red 92 in M3$_1$ were changed to 4.0 parts of C.I. Food Black 2, and the amount of deionized water was changed to 85.95 parts.

(Preparation of Recording Ink 3$_2$)

Recording Ink 3$_2$ composed of inks Y3$_2$, M3$_2$, C3$_2$ and Bk3$_2$ having yellow, magenta, cyan and black colors, respectively, was prepared in exactly the same manner as in the preparation of Recording Ink 3$_1$ of Y3$_1$, M3$_1$, C3$_1$ and Bk3$_1$ except that a styrene-acrylic acid copolymer (Johncryl 61J, trade name, product of Johnson Company, Ltd., Mw=10,000) was added in an amount of 0.5 part to the respective inks of Recording Ink 3$_1$ and the amount of deionized water in each ink was controlled in such a manner that the total amount of the ink amounted to 100 parts.

(Preparation of Recording Ink 3$_3$)

Recording ink 3$_3$ composed of inks Y3$_3$, M3$_3$, C3$_3$ and Bk3$_3$ having yellow, magenta, cyan and black colors, respectively, was prepared in exactly the same manner as in the preparation of Recording Ink 3$_1$ of Y3$_1$, M3$_1$, C3$_1$ and Bk3$_1$ except that an anionic surfactant [Viewlight ESS, trade name, product of Sanyo Chemical Industries, Ltd., disodium polyoxyethylene alkyl($C_{12}$–$C_{16}$)sulfosuccinate (2E.O)] was added in an amount of 1.0 part to the respective inks of Recording Ink 3$_1$, and the amount of deionized water in each ink was controlled in such a manner that the total amount of the ink amounted to 100 parts.

(Preparation of Recording Ink 3$_4$)

Yellow Ink Y3$_4$ of Recording Ink 3$_4$:

An alkali-soluble resin (styrene-acrylic acid-ethyl acrylate; acid value: 160; weight average molecular weight: 8,000) was used as a dispersant to prepare the following dispersion for a yellow ink. Incidentally, monoethanolamine was used as a neutralizer for the alkali-soluble resin.

| | |
|---|---|
| Aqueous alkali-soluble resin solution P3$_1$ (solids content: 20%) | 35 parts |
| C.I. Pigment Yellow 83 | 24 parts |
| Triethylene glycol | 10 parts |
| Diethylene glycol | 10 parts |
| Ethylene glycol monobutyl ether | 1.0 part |
| Isopropyl alcohol | 0.5 part |
| Deionized water | 135 parts. |

The above components were charged in a batch-wise vertical sand mill (manufactured by Aimex Company), and glass beads having a diameter of 1 mm were charged as a grinding medium to conduct a dispersion treatment for 3 hours while cooling with water. The dispersion was centrifuged to remove coarse particles, thereby obtaining a dispersion having an average particle size of 100 nm.

After 100 parts of deionized water were added to the dispersion, the mixture was thoroughly stirred to obtain Yellow Ink Y3$_4$ of pH 9.5.

Cyan Ink C3$_4$ of Recording Ink 3$_4$:

The same aqueous alkali-soluble resin solution P3$_1$ as that used in the preparation of Y3$_4$ was used. After the following components were mixed, a dispersion treatment was conducted under the same conditions as in the preparation of Y3$_4$.

| | |
|---|---|
| Aqueous alkali-soluble resin solution P3$_1$ (solids content: 20%) | 30 parts |

| | |
|---|---|
| C.I. Pigment Blue 15:3 | 24 parts |
| Triethylene glycol | 10 parts |
| Diethylene glycol | 10 parts |
| Ethylene glycol monobutyl ether | 1.0 part |
| Isopropyl alcohol | 3 parts |
| Deionized water | 135 parts. |

The thus-obtained dispersion had an average particle size of 120 nm.

After 100 parts of deionized water were added to the dispersion, the mixture was thoroughly stirred to obtain Cyan Ink $C3_4$ of pH 9.2.

Magenta Ink $M3_4$ of Recording Ink $3_4$:

The same aqueous alkali-soluble resin solution $P3_1$ as that used in the preparation of $Y3_4$ was used. After the following components were mixed, a dispersion treatment was conducted under the same conditions as in the preparation of $Y3_4$.

| | |
|---|---|
| Aqueous alkali-soluble resin solution $P3_1$ (solids content: 20%) | 20 parts |
| C.I. Pigment Red 122 | 24 parts |
| Glycerol | 15 parts |
| Isopropyl alcohol | 3 parts |
| Deionized water | 135 parts. |

The thus-obtained dispersion had an average particle size of 115 nm.

After 100 parts of deionized water were added to the dispersion, the mixture was thoroughly stirred to obtain Magenta Ink $M3_4$ of pH 9.4.

Black Ink $Bk3_4$ of Recording Ink $3_4$:

The following components were mixed and heated to 70° C. on a water bath, thereby completely dissolving a resin.

| | |
|---|---|
| Styrene-acrylic acid-ethyl acrylate copolymer (acid value: 160; weight average molecular weight: 8,000) | 1.5 parts |
| Monoethanolamine | 1.2 parts |
| Deionized water | 81.5 parts. |

To this solution, were added 10 parts of carbon black (MCF 88, product of Mitsubishi Chemical Industries Limited) and 1 part of isopropyl alcohol to premix them for 30 minutes. Thereafter, the resultant premix was subjected to a dispersion treatment under the following conditions:

| | |
|---|---|
| Dispersing machine: | Sand Grinder (manufactured by Igarashi Kikai K.K.) |
| Grinding medium: | zirconium beads |
| Packing rate of the grinding medium: | 50% (by volume) |
| Grinding time: | 3 hours. |

The dispersion was further subjected to a centrifugal treatment (12,000 rpm, 20 minutes) to remove coarse particles into a dispersion.

The following components were then mixed to obtain Black Ink $Bk3_4$ of Recording Ink $3_4$ having a pH of 9.5.

| | |
|---|---|
| Dispersion described above | 30 parts |
| Glycerol | 10 parts |
| Ethylene glycol | 5 parts |
| N-Methylpyrrolidone | 5 parts |
| Isopropyl alcohol | 2 parts |
| Deionized water | 48 parts. |

(Preparation of Recording Ink $3_5$)

Inks of yellow, magenta, cyan and black colors were prepared in exactly the same manner as in the preparation of Recording Ink $3_4$ except that the dispersant in Recording Ink $3_4$ was changed to an equiamount of polyvinyl pyrrolidone PVP K-15 (product of International Specialty Chemicals, MW=7,000).

Then, an anionic surfactant [Viewlight ESS, trade name, product of Sanyo Chemical Industries, Ltd., disodium polyoxyethylene alkyl($C_{12}$–$C_{16}$)sulfosuccinate (2E.O)] was added to the thus-obtained inks in a proportion of 1.0 part per 100 parts of the respective inks, and the resultant mixtures were thoroughly mixed, thereby obtaining Recording Ink $3_5$ composed of inks $Y3_5$, $M3_5$, $C3_5$ and $Bk3_5$ having yellow, magenta, cyan and black colors, respectively.

Using the combinations of the thus-obtained liquid compositions and recording inks as ink sets, recording was then conducted on Canon PPC paper. As an ink-jet recording apparatus, was used a recording apparatus similar to that shown in FIG. 4. Color images were formed using 5 recording heads as illustrated in FIG. 7. Incidentally, the individual recording heads used had a recording density of 360 dpi, and were driven with a drive frequency of 5 kHz. In view of the ejection volume per dot, heads from which an ink can be ejected at a rate of 40 pl/dot was used for the yellow, magenta and cyan inks and the liquid compositions, while a head from which an ink can be ejected at a rate of 80 pl/dot was used for the black inks using a dye as a coloring material, or a head from which an ink can be ejected at a rate of 60 pl/dot was used for the black inks using a pigment as a coloring material.

The printing was performed in accordance with the combinations of the colorless or pale-colored liquid compositions and the recording inks and their printing order shown in Table 6.

TABLE 6

| Example | Liquid composition | Ink | Printing process |
|---|---|---|---|
| 64 | $III_A$ | $3_1$ | Ejecting $III_A$ first |
| 65 | $III_A$ | $3_1$ | Ejecting $III_A$ later |
| 66 | $III_A$ | $3_4$ | Ejecting $III_A$ first |
| 67 | $III_A$ | $3_4$ | Ejecting $III_A$ later |
| 68 | $III_B$ | $3_1$ | Ejecting $III_B$ first |
| 69 | $III_B$ | $3_1$ | Ejecting $III_B$ later |
| 70 | $III_B$ | $3_4$ | Ejecting $III_B$ first |
| 71 | $III_B$ | $3_4$ | Ejecting $III_B$ later |
| 72 | $III_C$ | $3_1$ | Ejecting $III_C$ first |
| 73 | $III_C$ | $3_1$ | Ejecting $III_C$ later |
| 74 | $III_C$ | $3_4$ | Ejecting $III_C$ first |
| 75 | $III_C$ | $3_4$ | Ejecting $III_C$ later |
| 76 | $III_D$ | $3_1$ | Ejecting $III_D$ first |
| 77 | $III_D$ | $3_1$ | Ejecting $III_D$ later |
| 78 | $III_D$ | $3_4$ | Ejecting $III_D$ first |
| 79 | $III_D$ | $3_4$ | Ejecting $III_D$ later |
| 80 | $III_E$ | $3_1$ | Ejecting $III_E$ first |
| 81 | $III_E$ | $3_1$ | Ejecting $III_E$ later |
| 82 | $III_E$ | $3_2$ | Ejecting $III_E$ first |
| 83 | $III_E$ | $3_2$ | Ejecting $III_E$ later |
| 84 | $III_E$ | $3_3$ | Ejecting $III_E$ first |

TABLE 6-continued

| Example | Liquid composition | Ink | Printing process |
|---|---|---|---|
| 85 | $III_E$ | $3_3$ | Ejecting $III_E$ later |
| 86 | $III_E$ | $3_4$ | Ejecting $III_E$ first |
| 87 | $III_E$ | $3_4$ | Ejecting $III_E$ later |
| 88 | $III_E$ | $3_5$ | Ejecting $III_E$ first |
| 89 | $III_E$ | $3_5$ | Ejecting $III_E$ later |
| 90 | $III_F$ | $3_1$ | Ejecting $III_F$ first |
| 91 | $III_F$ | $3_1$ | Ejecting $III_F$ later |
| 92 | $III_F$ | $3_2$ | Ejecting $III_F$ first |
| 93 | $III_F$ | $3_2$ | Ejecting $III_F$ later |
| 94 | $III_F$ | $3_3$ | Ejecting $III_F$ first |
| 95 | $III_F$ | $3_3$ | Ejecting $III_F$ later |
| 96 | $III_F$ | $3_4$ | Ejecting $III_F$ first |
| 97 | $III_F$ | $3_4$ | Ejecting $III_F$ later |
| 98 | $III_F$ | $3_5$ | Ejecting $III_F$ first |
| 99 | $III_F$ | $3_5$ | Ejecting $III_F$ later |
| 100 | $III_G$ | $3_1$ | Ejecting $III_G$ first |
| 101 | $III_G$ | $3_1$ | Ejecting $III_G$ later |
| 102 | $III_G$ | $3_2$ | Ejecting $III_G$ first |
| 103 | $III_G$ | $3_2$ | Ejecting $III_G$ later |
| 104 | $III_G$ | $3_3$ | Ejecting $III_G$ first |
| 105 | $III_G$ | $3_3$ | Ejecting $III_G$ later |
| 106 | $III_G$ | $3_4$ | Ejecting $III_G$ first |
| 107 | $III_G$ | $3_4$ | Ejecting $III_G$ later |
| 108 | $III_G$ | $3_5$ | Ejecting $III_G$ first |
| 109 | $III_G$ | $3_5$ | Ejecting $III_G$ later |

The resultant recorded images were evaluated in accordance with the methods described above. The results are shown collectively in Table 7.

COMPARATIVE EXAMPLES 7 TO 11

Printing test and evaluation were performed in exactly the same manner as in Examples 1 to 42 except that Inks $3_1$ to $3_5$ were separately used, but no liquid composition was used. The results are shown in Table 8.

TABLE 7

| Ex. | Image density | Fixing ability | Quality of character | Resistance to bleeding | Water fastness |
|---|---|---|---|---|---|
| 64 | AA | AA | AA | AA | AA |
| 65 | AA | AA | A | AA | AA |
| 66 | AA | AA | AA | AA | AA |
| 67 | AA | AA | AA | AA | AA |
| 68 | AA | AA | AA | AA | AA |
| 69 | AA | AA | A | AA | AA |
| 70 | AA | AA | AA | AA | AA |
| 71 | AA | AA | AA | AA | AA |
| 72 | AA | AA | AA | AA | AA |
| 73 | AA | AA | A | AA | AA |
| 74 | AA | AA | AA | AA | AA |
| 75 | AA | AA | AA | AA | AA |
| 76 | AA | AA | AA | AA | AA |
| 77 | AA | AA | AA | AA | AA |
| 78 | AA | AA | A | AA | AA |
| 79 | AA | AA | AA | AA | AA |
| 80 | AA | A | AA | AA | AA |
| 81 | AA | A | A | AA | AA |
| 82 | AA | A | AA | AA | AA |
| 83 | AA | A | AA | AA | AA |
| 84 | AA | AA | AA | AA | AA |
| 85 | AA | AA | A | AA | AA |
| 86 | AA | A | AA | AA | AA |
| 87 | AA | A | AA | AA | AA |
| 88 | AA | AA | AA | AA | AA |
| 89 | AA | AA | AA | AA | AA |
| 90 | AA | A | AA | AA | AA |
| 91 | AA | A | A | AA | AA |
| 92 | AA | A | AA | AA | AA |
| 93 | AA | A | AA | AA | AA |
| 94 | AA | AA | A | AA | AA |
| 95 | AA | AA | AA | AA | AA |
| 96 | AA | A | AA | AA | AA |
| 97 | AA | A | AA | AA | AA |
| 98 | AA | AA | AA | AA | AA |
| 99 | AA | AA | AA | AA | AA |
| 100 | AA | A | AA | AA | AA |
| 101 | AA | A | A | AA | AA |
| 102 | AA | A | AA | AA | AA |
| 103 | AA | A | AA | AA | AA |
| 104 | AA | AA | AA | AA | AA |
| 105 | AA | AA | A | AA | AA |
| 106 | AA | A | AA | AA | AA |
| 107 | AA | A | AA | AA | AA |
| 108 | AA | AA | AA | AA | AA |
| 109 | AA | AA | AA | AA | AA |

TABLE 8

| Comp. Ex. | Image density | Fixing ability | Quality of character | Resistance to bleeding | Water fastness |
|---|---|---|---|---|---|
| 7 | AA | B | AA | C | C |
| 8 | AA | B | AA | C | C |
| 9 | B | AA | C | C | C |
| 10 | C | C | AA | C | AA |
| 11 | C | C | AA | C | AA |

As has been described above, the practice of the present invention permits the provision of images satisfying high-speed fixing, high print quality, resistance to bleeding and perfect water fastness even when conducting color ink-jet recording on plain paper.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded to the broadest interpretation so as to encompass all such modifications and equivalent structures and functions.

What is claimed is:

1. A liquid composition for use in an ink-jet image forming process with an ink containing an anionic dye, or an anionic compound and a pigment, the liquid composition being ejected through an orifice of an ink-jet head by an ink-jet ejecting process, comprising a cationic substance and a nonionic polymeric substance, the liquid composition aggregating the anionic dye or anionic compound in the ink by contacting the liquid composition with the ink, wherein the cationic substance has a weight average molecular weight of at most 1,000, and the nonionic polymeric substance has a weight average molecular weight of at least 2,000.

2. The liquid composition according to claim 1, wherein the cationic substance and the nonionic polymeric substance are contained in the liquid composition in a range of from 0.05 to 20% by weight in total.

3. The liquid composition according to claim 1, wherein the cationic substance is a surfactant.

4. The liquid composition according to claim 1, wherein the mixing ratio of the cationic substance to the nonionic polymeric substance is within a range of from 10:1 to 1:10 by weight.

5. The liquid composition according to claim 1, wherein the cationic substance has a weight average molecular weight of from 100 to 700.

6. The liquid composition according to claim 1, wherein the pH of the liquid composition is from 3 to 12.

7. The liquid composition according to claim 6, wherein the pH is from 3 to 8.

8. A liquid composition for use in an ink-jet image forming process with an ink containing an anionic dye, or an anionic compound and a pigment, the liquid composition being ejected through an orifice of an ink-jet head by an ink-jet ejecting process, comprising a cationic oligomer and a nonionic polymeric substance, the liquid composition reacting with the anionic dye or the anionic compound in the ink to make the anionic dye or the anionic compound aggregated by contacting the liquid composition with the ink, wherein the cationic oligomer has one peak in a molecular weight region of not higher than 1,000 in a molecular weight distribution thereof as measured by GPC method, and wherein the nonionic polymeric substance has a weight average molecular weight of at least 2,000.

9. The liquid composition according to claim 8, wherein the peak is in a molecular weight region of not higher than 1,000, and the nonionic polymeric substance has a weight average molecular weight of not lower than 2,000, but not higher than 10,000.

10. The liquid composition according to claim 8, wherein the cationic oligomer and the nonionic polymeric substance are contained in a range of from 0.05 to 20% by weight in total.

11. The liquid composition according to claim 8, wherein the cationic oligomer is selected from the group consisting of polyvinylamine, polyallylamine, polyvinylpyridine, polyethyleneimine and the hydrochlorides, acetates and sulfates thereof.

12. The liquid composition according to claim 8, wherein the cationic oligomer is selected from quaternary ammonium salts of polyoxyethylene having the following structure

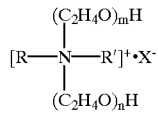

wherein R and R' denote individually an alkyl or benzyl, m+n is an integer of 2 to 10, X denotes $Br^-$, $Cl^-$, $I^-$, $CH_3COO^-$, or $C_2H_5SO_3^-$.

13. The liquid composition according to claim 8, further comprising a cationic surfactant.

14. The liquid composition according to claim 8, wherein the mixing ratio of the cationic oligomer to the nonionic polymeric substance is within a range of from 10:1 to 1:10 by weight.

15. The liquid composition according to claim 8, wherein the pH of the liquid composition is from 3 to 12.

16. The liquid composition according to claim 15, wherein the pH is from 3 to 8.

17. A liquid composition for use in an ink-jet image forming process with an ink containing an anionic dye, or an anionic compound and a pigment, the liquid composition being ejected through an orifice of an ink-jet head by an ink-jet ejecting process, comprising a first cationic substance and a second cationic substance, wherein each of the first cationic substance and the second cationic substance has one peak in respective molecular weight distributions of the first and the second cationic substances as measured by GPO method, and wherein positions of the peak in the respective molecular weight distributions are different from each other.

18. The liquid composition according to claim 17, wherein one of the cationic compounds is a surfactant.

19. The liquid composition according to claim 17, wherein one of the two peaks exists in a molecular weight distribution region of not higher than 1,000, and another peak exists in a molecular weight region of not lower than 1,500.

20. The liquid composition according to claim 19, wherein the cationic substance having the peak in a molecular weight region of not higher than 1,000 is selected from the group consisting of compounds of primary, secondary or tertiary amine salts, compounds of quaternary ammonium salt, pyridinium salt compounds, imidazoline cationic compounds and ethylene oxide adducts of secondary alkylamines.

21. The liquid composition according to claim 20, wherein the compounds of primary, secondary or tertiary amine salt include hydrochlorides and acetates of laurylamine, coconut amine, stearylamine and rosin amine.

22. The liquid composition according to claim 20, wherein the compounds of quaternary ammonium salt include lauryltrimethylammonium chloride, lauryldimethylbenzylammonium chloride, benzyltributylammonium chloride, benzalkonium chloride, and cetyltrimethylammonium chloride.

23. The liquid composition according to claim 20, wherein the pyridinium salt compounds include cetylpyridinium chloride and cetylpyridinium bromide.

24. The liquid composition according to claim 20, wherein the imidazoline cationic compounds include 2-heptadecenylhydroxyethylimidazoline.

25. The liquid composition according to claim 20, wherein ethylene oxide adducts of secondary alkylamines include dihydroxyethylstearylamine.

26. The liquid composition according to claim 19, wherein the cationic substance having the peak in a molecular weight region of not less than 1,500, is selected from the group consisting of polyallylamine, polyamine sulfone, polyvinylamine, chitosan and neutralized products or partially neutralized products thereof.

27. The liquid composition according to claim 19, wherein the cationic substance having the peak in a molecular weight region of not less than 1,500, is selected from cationized nonionic polymeric substances.

28. The liquid composition according to claim 27, wherein the cationized nonionic polymeric substances include copolymers of vinylpyrrolidone and an aminoalkylalkylate quaternary salt, and copolymers of acrylamide and an aminoethylacrylamide quaternary salt.

29. The liquid composition according to claim 19, wherein the mixing ratio of the cationic substance having the peak in a molecular weight region of not higher than 1,000, to the cationic substance having the peak in a molecular weight region of not lower than 1,500 is within a range of from 10:1 to 1:10 by weight.

30. The liquid composition according to claim 17, wherein the cationic substance is contained in a range of from 0.05 to 20% by weight in total.

31. The liquid composition according to claim 17, wherein the pH of the liquid composition is from 3 to 12.

32. The liquid composition according to claim 31, wherein the pH is from 3 to 8.

33. A liquid composition for use in an ink-jet image forming process with an ink containing an anionic dye, or an anionic compound and a pigment, the liquid composition being ejected through an orifice of an ink-jet head by an ink-jet ejecting process comprising a first cationic substance having a peak in a molecular weight region of not higher than 1,000 in a molecular weight distribution of the first cationic substance as measured by GPC method, and a second cationic substance having a peak in a molecular weight region of from 1,500 to 10,000 in a molecular weight distribution of the second cationic substance as measured by GPC method.

34. The liquid composition according to claim 33, wherein the cationic substance is contained in the liquid composition in a range of from 0.05 to 20% by weight.

35. The liquid composition according to claim 33, wherein one of the cationic compounds is a surfactant.

36. The liquid composition according to claim 33, wherein the cationic substance having the peak in a molecular weight region of not higher than 1,000 is selected from the group consisting of primary, secondary or tertiary amine salt compounds, quaternary ammonium salt compounds, pyridinium salt compounds, imidazoline cationic compounds and ethylene oxide adducts of secondary alkylamines.

37. The liquid composition according to claim 36, wherein the compounds of primary, secondary or tertiary amine salt include hydrochlorides and acetates of laurylamine, coconut amine, stearylamine and rosin amine.

38. The liquid composition according to claim 36, wherein the compounds of quaternary ammonium salt include lauryltrimethylammonium chloride, lauryldimethylbenzylammonium chloride, benzyltributylammonium chloride, benzalkonium chloride, and cetyltrimethylammonium chloride.

39. The liquid composition according to claim 36, wherein the pyridinium salt compounds include cetylpyridinium chloride and cetylpyridinium bromide.

40. The liquid composition according to claim 36, wherein the imidazoline cationic compounds include 2-heptadecenylhydroxyethylimidazoline.

41. The liquid composition according to claim 36, wherein ethylene oxide adducts of secondary alkylamines include dihydroxyethylstearylamine.

42. The liquid composition according to claim 33, wherein the cationic substance having the peak in a molecular weight region of not less than 1,500 but not more than 10,000, is selected from the group consisting of polyallylamine, polyamine sulfone, polyvinylamine, chitosan and neutralized products or partially neutralized products thereof.

43. The liquid composition according to claim 33, wherein the cationic substance having the peak in a molecular weight region of not less than 1,500 but not more than 10,000, is selected from cationized nonionic polymeric substances.

44. The liquid composition according to claim 43, wherein the cationized nonionic polymeric substances include copolymers of vinylpyrrolidone and an aminoalkylalkylate quaternary salt, and copolymers of acrylamide and an aminoethylacrylamide quaternary salt.

45. The liquid composition according to claim 33, wherein the pH of the liquid composition is from 3 to 12.

46. The liquid composition according to claim 45, wherein the pH is from 3 to 8.

47. The liquid composition according to claim 33, wherein the mixing ratio of the cationic substance having the peak in a molecular weight region of not higher than 1,000, to the cationic substance having the peak in a molecular weight region from 1,500 to 10,000 is within a range of from 10:1 to 1:10 by weight.

48. An ink set comprising in combination:
an ink and a liquid composition,
wherein the ink contains an anionic dye, or an anionic compound and a pigment, and the ink is selected from the group consisting of yellow, magenta, cyan, black, red, blue and green inks; and
wherein the liquid composition is a liquid composition according to any one of claims 1, 8, 9, 17, 19, or 33.

49. The ink set according to claim 48, wherein the ink containing the anionic dye further contains an anionic compound.

50. The ink set according to claim 49, wherein the anionic compound is a polymeric substance having a weight average molecular weight of at least 1,000.

51. The ink set according to claim 49, wherein the anionic compound is a surfactant.

52. The ink set according to claim 48, wherein the anionic dye is a water-soluble dye having an anionic group.

53. The ink set according to claim 48, wherein the anionic compound is a dispersant for the pigment.

54. The ink set according to claim 48, wherein the pH of the ink is from 7 to 10.

55. An ink set comprising in combination:
four inks and a liquid composition,
wherein the four inks are yellow, magenta, cyan and black inks, all of which contain an anionic dye, or an anionic compound and a pigment; and
the liquid composition is a liquid composition according to any one of claims 1, 8, 9, 17, 19, or 33.

56. The ink set according to claim 55, wherein the ink containing the anionic dye further contains an anionic compound.

57. The ink set according to claim 56, wherein the anionic compound is a polymeric substance having a weight average molecular weight of at least 1,000.

58. The ink set according to claim 56, wherein the anionic compound is a surfactant.

59. The ink set according to claim 55, wherein the anionic dye is a water-soluble dye having an anionic group.

60. The ink set according to claim 55, wherein the anionic compound is a dispersant for the pigment.

61. The ink set according to claim 55, wherein the pH of the ink is from 7 to 10.

62. An ink set comprising in combination:
three inks of yellow, magenta and cyan, each of the three inks containing an anionic dye, or an anionic compound and a pigment; and
the liquid composition according to any one of claims 1, 8, 9, 17, 19, or 33.

63. The ink set according to claim 62, wherein the ink containing the anionic dye further contains an anionic compound.

64. The ink set according to claim 63, wherein the anionic compound is a polymeric substance having a weight average molecular weight of at least 1,000.

65. The ink set according to claim 63, wherein the anionic compound is a surfactant.

66. The ink set according to claim 62, wherein the anionic dye is a water-soluble dye having an anionic group.

67. The ink set according to claim 62, wherein the anionic compound is a dispersant for the pigment.

68. The ink set according to claim 62, wherein the pH of the ink is from 7 to 10.

69. The liquid composition according to any one of claims 1, 8, 17 or 33, wherein the liquid composition is colorless or has a pale color that does not affect color of the image.

70. A liquid composition for use in an ink-jet image forming process with an ink containing an anionic dye or an anionic compound and a pigment, and for use in an ink-jet ejecting process, a cationic substance and a nonionic polymeric substance, the liquid composition aggregating the anionic dye or anionic compound in the ink by contacting the liquid composition with the ink, wherein the cationic substance has a weight average molecular weight of at most 1,000, and the nonionic polymeric substance has a weight average molecular weight of at least 2,000, and wherein the liquid composition is substantially free from any coloring materials.

71. A liquid composition for use in an ink-jet image forming process with an ink containing an anionic dye or an anionic compound and a pigment, the liquid composition being elected through an orifice of an ink-let head by an ink-jet ejecting process, comprising a cationic oligomer and a nonionic polymeric substance, the liquid composition reacting with the anionic dye or the anionic compound in the ink to make the anionic dye or anionic compound aggregated by contacting the liquid composition with the ink, wherein the cationic oligomer has one peak in a molecular weight region of not higher than 1,000 in a molecular weight distribution thereof as measured by GPC method, and the nonionic polymeric substance has a weight average molecular weight of at least 2,000, and wherein the liquid composition is substantially free from any coloring materials.

72. A liquid composition for use in an ink-jet image forming process with an ink containing an anionic dye, or an anionic compound and a pigment, the liquid composition being ejected through an orifice of an ink-jet head by an ink-jet ejecting process, comprising a first cationic substance and a second cationic substance, wherein each of the first and second cationic substances has one peak in a molecular weight distribution thereof as measured by GPC method, wherein the peak positions in the respective molecular weight distributions are different from each other, and wherein the liquid composition is substantially free from any coloring materials.

73. A liquid composition for use in an ink-jet image forming process with an ink containing an anionic dye, or an anionic compound and a pigment, comprising a first cationic substance and a second cationic substance, wherein the first cationic substance has one peak in a molecular weight region of not higher than 1,000 in a molecular weight distribution thereof as measured by GPC method, and the second cationic substance has one peak in a molecular weight region of from 1,500 to 10,000 in a molecular weight distribution thereof as measured by GPC method, and wherein the liquid composition is substantially free from any coloring materials.

74. A liquid composition for being ejected through an orifice of an ink-jet head by an ink-jet process, comprising a first cationic substance having one peak in a molecular weight distribution thereof as measured by GPC method, and a second cationic substance having one peak in a molecular weight distribution thereof as measured by GPC method, wherein peaks' positions are different from each other.

75. An ink set comprising in combination, at least two inks and a liquid composition, wherein each of the inks contains an anionic dye, or an anionic compound and a pigment, and the inks are selected from the group consisting of yellow, magenta, cyan, black, red, blue and green inks, and wherein the liquid composition is a liquid composition according to any one of claims 70 to 74.

* * * * *

UNITED STATES PATENT AND TRADEMARK OFFICE
CERTIFICATE OF CORRECTION

PATENT NO. : 6,794,427 B2
DATED : September 21, 2004
INVENTOR(S) : Kurabayashi et al.

It is certified that error appears in the above-identified patent and that said Letters Patent is hereby corrected as shown below:

Title page,
Item [56], References Cited, FOREIGN PATENT DOCUMENTS,
"5565269    5/1980        should read --  55-65269   5/1980
 5566976    5/1980                        55-66976   5/1980
 6159911    12/1986                       61-59911   12/1986
 6159912    12/1986                       61-59912   12/1986
 6159914    12/1986                       61-59914   12/1986
 6322681    1/1988                        63-22681   1/1988
 6360783    3/1988                        63-60783   3/1988
 649279     1/1989                        64-9279    1/1989
 6463185    3/1989"                       64-63185   3/1989
 6469381    3/1989"                       64-69381   3/1989 --.
"6238155 *  8/1987" should be deleted.
 63299971   12/1988" should be deletd.
OTHER PUBLICATIONS, insert
-- Harada Susumu, "Novel Reactive Polymer-Polyallylamine", "Kino Zairyo (Function and Materials)" Vol. 5, 29-36 (December 1985). --.

Column 14,
Line 58, "equation" should read -- equation: --.

Column 25,
Line 3, "Liquid" should read -- liquid --.

Column 27,
Line 1, "Bk2" should read -- $Bk2_1$: --.

Column 41,
Line 41, "ture" should read -- ture: --.

Column 42,
Line 4, "GPO" should read -- GPC --.

UNITED STATES PATENT AND TRADEMARK OFFICE
CERTIFICATE OF CORRECTION

PATENT NO.   : 6,794,427 B2
DATED        : September 21, 2004
INVENTOR(S)  : Kurabayashi et al.

It is certified that error appears in the above-identified patent and that said Letters Patent is hereby corrected as shown below:

Column 45,
Line 20, "elected" should read -- ejected -- and "ink-let" should read -- ink-jet --.

Signed and Sealed this

Twelfth Day of April, 2005

JON W. DUDAS
*Director of the United States Patent and Trademark Office*